United States Patent
Lahav et al.

(10) Patent No.: US 10,980,220 B2
(45) Date of Patent: Apr. 20, 2021

(54) DISINFECTION AND REMOVAL OF NITROGEN SPECIES FROM SALINE AQUACULTURE SYSTEMS

(71) Applicant: TECHNION RESEARCH & DEVELOPMENT FOUNDATION LIMITED, Haifa (IL)

(72) Inventors: Ori Lahav, Givat Ela (IL); Raz Ben-Asher, Kibutz Ein Hamifratz (IL); Youri Gendel, Haifa (IL); Liat Birnhack, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 127 days.

(21) Appl. No.: 16/082,968

(22) PCT Filed: Mar. 8, 2017

(86) PCT No.: PCT/IL2017/050281
§ 371 (c)(1),
(2) Date: Sep. 7, 2018

(87) PCT Pub. No.: WO2017/153986
PCT Pub. Date: Sep. 14, 2017

(65) Prior Publication Data
US 2019/0082661 A1 Mar. 21, 2019

Related U.S. Application Data

(60) Provisional application No. 62/304,985, filed on Mar. 8, 2016.

(51) Int. Cl.
*C02F 1/46* (2006.01)
*A01K 63/04* (2006.01)
(Continued)

(52) U.S. Cl.
CPC .............. *A01K 63/04* (2013.01); *C02F 1/467* (2013.01); *C02F 1/20* (2013.01); *C02F 1/58* (2013.01);
(Continued)

(58) Field of Classification Search
CPC . A01K 63/04; C02F 1/467; C02F 1/58; C02F 1/20; C02F 1/66; C02F 101/16; C02F 103/08; C02F 103/20; C02F 1/46
See application file for complete search history.

(56) References Cited

U.S. PATENT DOCUMENTS 3,723,308 A 3/1973 Breck
3,931,003 A 1/1976 Jorgensen
(Continued)

FOREIGN PATENT DOCUMENTS

CN 101426734 A 5/2009
DE 203711 A1 11/1983
(Continued)

OTHER PUBLICATIONS

Ben-Asher et al., (2016) Electrooxidation for simultaneous ammonia control and disinfection in seawater recirculating aquaculture systems. Aquacultural Engineering 72-73: 77-87.
(Continued)

*Primary Examiner* — Cameron J Allen
(74) *Attorney, Agent, or Firm* — J.A. Lindeman & Co. PLLC

(57) ABSTRACT

Provided are physico-chemical processes for continuous and simultaneous water disinfection, oxidation of off flavor agents, minimization of trihalomethane (THM) production, reduction of nitrate and nitrite production and oxidation of ammonia so as to remove nitrogen species, in saline (for example, seawater) based aquaculture systems. The aquaculture system may be any handling/storage/transport sys-
(Continued)

tem, for example, recirculated aquaculture systems (RAS), for fish or other aquaculture species.

21 Claims, 8 Drawing Sheets

(51) Int. Cl.
    *C02F 1/467*     (2006.01)
    *C02F 101/16*     (2006.01)
    *C02F 103/20*     (2006.01)
    *C02F 1/66*     (2006.01)
    *C02F 103/08*     (2006.01)
    *C02F 1/20*     (2006.01)
    *C02F 1/58*     (2006.01)

(52) U.S. Cl.
    CPC ............ *C02F 1/66* (2013.01); *C02F 2101/16* (2013.01); *C02F 2101/163* (2013.01); *C02F 2101/166* (2013.01); *C02F 2103/08* (2013.01); *C02F 2103/20* (2013.01); *C02F 2201/008* (2013.01); *C02F 2303/04* (2013.01); *C02F 2303/185* (2013.01)

(56) References Cited

U.S. PATENT DOCUMENTS

| | | | |
|---|---|---|---|
| 4,070,504 | A | 1/1978 | Bianchi |
| 4,344,851 | A | 8/1982 | Sherman |
| 4,397,719 | A | 8/1983 | Yoshida |
| 4,517,084 | A | 5/1985 | Pincon |
| 4,522,727 | A | 6/1985 | Weber |
| 4,528,037 | A | 7/1985 | Guidat |
| 4,614,591 | A | 9/1986 | Jorgensen |
| 4,695,387 | A | 9/1987 | Berry |
| 4,734,200 | A | 3/1988 | Berry |
| 4,956,057 | A | 9/1990 | Stucki |
| 5,175,131 | A | 12/1992 | Lang |
| 5,205,237 | A | 4/1993 | Skeggs |
| 5,496,545 | A | 3/1996 | Holmes-Farley |
| 5,512,182 | A | 4/1996 | Sheikh |
| 5,540,819 | A | 7/1996 | Bakhir |
| 5,616,221 | A | 4/1997 | Aoki |
| 5,622,610 | A | 4/1997 | Nakamura |
| 6,083,377 | A | 7/2000 | Lin |
| 6,432,312 | B1 | 8/2002 | Fuss |
| 7,736,776 | B1 | 6/2010 | Spielman |
| 2001/0004962 | A1 | 6/2001 | Hirota |
| 2002/0189935 | A1 | 12/2002 | Shelp |
| 2003/0052062 | A1 | 3/2003 | Iseki |
| 2003/0173300 | A1 | 9/2003 | Bradley |
| 2003/0226766 | A1* | 12/2003 | Orlebeke ............... A01K 63/04 205/688 |
| 2004/0035716 | A1 | 2/2004 | Ikegami |
| 2004/0134796 | A1 | 7/2004 | Shelp |
| 2004/0232088 | A1 | 11/2004 | Stenmark |
| 2004/0251212 | A1 | 12/2004 | Ikematsu |
| 2004/0256317 | A1 | 12/2004 | Yamada |
| 2005/0127323 | A1 | 6/2005 | Tyler |
| 2005/0211569 | A1 | 9/2005 | Botte |
| 2007/0023359 | A1 | 2/2007 | Grott |
| 2007/0039893 | A1 | 2/2007 | Kemp |
| 2007/0163952 | A1 | 7/2007 | Schreier |
| 2008/0011679 | A1 | 1/2008 | Champagne |
| 2008/0023407 | A1 | 1/2008 | Eriksson |
| 2008/0277289 | A1 | 11/2008 | Seed |
| 2009/0314711 | A1 | 12/2009 | Barry |
| 2009/0317308 | A1 | 12/2009 | Ren |
| 2013/0292335 | A1* | 11/2013 | Lahav ................... A01K 63/04 210/664 |

FOREIGN PATENT DOCUMENTS

| | | |
|---|---|---|
| DE | 19853182 A1 | 5/2000 |
| DE | 10240572 A1 | 3/2004 |
| EP | 0659692 A1 | 6/1995 |
| EP | 0956767 A1 | 11/1999 |
| GB | 2332210 A | 6/1999 |
| JP | H105115870 | 5/1993 |
| JP | H106182325 A | 7/1994 |
| JP | H106182326 A | 7/1994 |
| JP | 2001/104957 A | 4/2001 |
| JP | 2001/353489 A | 12/2001 |
| JP | 2002/010724 A | 1/2002 |
| JP | 2002/045847 A | 2/2002 |
| JP | 2003/023917 A | 1/2003 |
| JP | 2003/284453 A | 10/2003 |
| JP | 2006/043663 A | 2/2006 |
| KR | 2007/0113494 A | 11/2007 |
| WO | 99/40990 A1 | 8/1999 |
| WO | 02/082895 A1 | 10/2002 |
| WO | 2005/075355 A2 | 8/2005 |
| WO | 2008/061975 A2 | 5/2008 |
| WO | 2011/157812 A1 | 12/2011 |
| WO | 2012/066554 A2 | 5/2012 |

OTHER PUBLICATIONS

Ben-Asher et al., (2019) Minimization of THM formation in seawater-fed recirculating aquaculture systems operated with electrochemical NH4+ removal. Aquaculture 502: 162-175.
Brungs (1973) Effects of residual chlorine on aquatic life. J Water Pollut Control Fed 45(10): 2180-2193.
Cripps et al., (2000) Solids management and removal for intensive land-based aquaculture production systems. Aquacultural Engineering 22(1-2): 33-56.
Diaz et al., (2011) Kinetics of electro-oxidation of ammonia-N, nitrites and COD from a recirculating aquaculture saline water system using BDD anodes. Water Research 45: 125-134.
Dryden et al., (1987) Aquaculture water treatment by ion-exchange: I. Capacity of hector clinoptilolite at 0•01-0•05 n. Aquacultural Engineering 6(1): 39-50.
Dryden et al., (1987) Aquaculture water treatment by ion-exchange: II. Selectivity Studies with Clinoptilolite at 0.01 N. Aquacultural Engineering 6(1): 51-68.
Dryden et al., (1989) Aquaculture water treatment by ion-exchange: Continuous Ammonium Ion Removal with Clinoptilolite. Aquacultural Engineering 8: 109-126.
Eshchar et al., (2006) Intensive fish culture at high ammonium and low pH. Aquaculture 255(1): 301-313.
Gendel et al., (2012) Revealing the mechanism of indirect ammonia electrooxidation. Electrochimica Acta 63: 209-219.
Gendel et al., (2013) A novel approach for ammonia removal from fresh-water recirculated aquaculture systems, comprising ion exchange and electrochemical regeneration. Aquacultural Engineering 52: 27-38.
Johnson et al., (1974) Ammonia removal by selective ion exchange. A backup system for microbiological filters in closed-system aquaculture. Aquaculture 4: 61-68.
Kropp et al., (2009) A device that converts aqueous ammonia into nitrogen gas. Aquacultural Engineering 41: 28-34.
Lahav et al., (2013) Sustainable removal of ammonia from anaerobic-lagoon swine waste effluents using an electrochemically-regenerated ion exchange process. Chemical Engineering Journal 218: 214-222.
Lee et al., (2002) Residual chlorine distribution and disinfection during electrochemical removal of dilute ammonia from an aqueous solution. Journal of Chemical Engineering of Japan 35(3): 285-289.
Lei et al., (2009) Electrochemical regeneration of zeolites and removal of ammonia. J Hazard Mater 169(1-3): 746-750.
Li et al., (2009) Ammonia removal in electrochemical oxidation: mechanism and pseudo-kinetics. Journal of Hazardous Materials 161(2-3): 1010-1016.
Li et al., (2009) Application of an electrochemical- ion exchange reactor for ammonia removal. Electrochimica Acta 55: 159-164.

(56) References Cited

OTHER PUBLICATIONS

Li et al., (2010) Removal of geosmin (trans-1,10-dimethyl-trans-9-decalol) from aqueous solution using an indirect electrochemical method. Electrochimica Acta 55(23): 6979-6982.

Li et al., (2010) Simultaneous regeneration of zeolites and removal of ammonia using an electrochemical method. Microporous Mesoporous Mater 127: 161-166.

Lin et al., (1996) Electrochemical removal of nitrite and ammonia for aquaculture. Wat Res 30(3): 715-721.

Lin et al., (1997) Electrochemical nitrite and ammonia oxidation in seawater. Journal of Environmental Science and Health Part A—Environmental Science and Engineering & Toxic and Hazardous Substances Control 32(8): 2125-2138.

Liu et al., (2009) Kinetic study of electrolytic ammonia removal using Ti/IrO2 as anode under different experimental conditions. J Hazard Mater 167(1-3): 959-965.

Liu et al., (2011) Wild and farmed salmon in Norway—A review. Marine Policy 35(3): 413-418.

Martins et al., (2010) New developments in recirculating aquaculture systems in Europe: A perspective on environmental sustainability. Aquacultural Engineering 43(3): 83-93.

Millero et al., (2006) Dissociation constants of carbonic acid in seawater as a function of salinity and temperature. Marine Chemistry 100(1-2): 80-94.

Miron et al., (2008) Ammonia and pH effects on some metabolic parameters and gill histology of silver catfish, Rhamdia quelen (Heptapteridae). Aquaculture 277(3-4): 192-196.

Salazar et al., (2009) Estimated use of water in the United States in 2005 (No. 1344). US Geological Survey; 60 pages.

Seed et al., (2003) A novel ion-exchange/electrochemical technology for the treatment of ammonia in wastewater (www.enpar-tech.com/documents/AmmEL_WEAO_2003.pdf.

Srinivasan et al., (2011) Treatment of taste and odor causing compounds 2-methyl isobomeol and geosmin in drinking water: A critical review. Journal of Environmental Sciences 23(1): 1-13.

Tung et al., (2011) Study on oxidation kinetics of dissolved 2-methylisoborneol. Sustainable Environment Research 21(6): 395-400.

Van Rijn et al., (2006) Denitrification in recirculating systems: Theory and applications. Aquacultural Engineering 34(3): 364-376.

Xue et al., (2011) Electrochemical degradation of geosmin using electrode of Ti/IrO2-Pt. Desalination 265(1-3): 135-139.

Zillich (1972) Toxicity of combined chlorine residuals to freshwater fish. J Water Pollut Control Fed 44(2): 212-220.

World Bank Report No. 83177-GLB, Dec. 2013. Fish to 2030: prospects for fisheries and aquaculture. Agriculture and Environmental Services Discussion Paper 03. http://www.fao.org/docrep/019/i3640e/i3640e.pdf; 102 pages.

Jing Zhu; Study of removing ammonia-nitrogen by electrochemical oxidation process. Chinese Master's Theses Full-text Database Engineering Science and Technology I, Nov. 11, 2012, pp. 29-58. English abstract pp. 3-5.

\* cited by examiner

DISINFECTION AND REMOVAL OF NITROGEN SPECIES FROM SALINE AQUACULTURE SYSTEMS

FIELD OF THE INVENTION

The present invention relates to physico-chemical processes for continuous and simultaneous water disinfection, oxidation of off flavor agents, minimization of trihalomethane (THM) production, reduction of nitrate and nitrite production and oxidation of ammonia so as to remove nitrogen species, in seawater or other saline-based aquaculture systems. The aquaculture system may be any handling/storage/transport system, e.g., recirculated aquaculture systems (RAS), for fish or other aquaculture species.

BACKGROUND OF THE INVENTION

Aquaculture, also known as the farming of aquatic organisms, provides nearly one third of all seafood consumed in the world at present. It constitutes an alternative to fishing and is expected to expand with the increase of consumers' demand for seafood and the decrease in wild supplies. Aquaculture systems can be extensive, semi-extensive, or intensive, depending on the number of organisms grown per volume of water. An exemplary extensive aquaculture system is a pond culture. Cage culture (net pen) is considered semi-intensive outside the cage and intensive inside the cage. The main disadvantage associated with earthen pond aquaculture systems is their high water consumption (typically 3-5 $m^3$ per kg fish produced). Both earthen ponds and net pen systems also tend to be environmentally unfriendly.

Global demand for fish and fishery products was projected by the World Bank to expand from 154 million tons in 2011 to 186 million tons by 2030. The growing demand coincides with a decrease in global wild fish stocks due to overfishing in the most fertile fishing areas in the world, likely resulting in further boost to aquaculture. It is also becoming clear that traditional land aquaculture is unsustainable due to the large volumes of water required and the intermittent pollution release from the ponds, which is largely uncontrolled.

The severe environmental effect of net pen aquaculture has also been recognized, leading policy makers to favor sustainable Recirculated Aquaculture System (RAS) technologies to provide a controlled environment in which fish grow. In these systems fish are raised in tanks, sometimes within closed buildings, while water is recycled throughout the system and various treatment units enable maintenance of adequate water quality. In this manner only a small percentage of the water is exchanged daily. Failure of any one of the treatment units can cause the entire system to fail, usually killing the fish population. RAS have relatively low water consumption and thus can be built at favorable locations, with less dependency on the water source. RAS further provide year-round production, mitigation of environmental risks (e.g. uncontrolled release of nutrients to the environment) and pollution. RAS are species-adaptable, allowing operators to follow market trends for seafood preference. Moreover, RAS constitute a "point source" of pollution, which enable efficient solids waste treatment and nutrient removal and are thus considered environmentally friendly.

The high fish densities in RAS require efficient gas-transfer systems which dissolve oxygen in the water and remove carbon dioxide from the culture water. Additionally, nonionized ammonia ($NH_3$) is toxic to many fish species at concentrations as low as 0.0125 mg $NH_3$—N $L^{-1}$. In order to avoid the accumulation of ammonia, a nitrification unit is invariably employed to reduce the total ammonia nitrogen (TAN, i.e. the sum of $NH_3$ and $NH_4^+$) to concentrations typically below 3 mg $L^{-1}$ (warm-water fish). One equivalent of alkalinity is added to the water for each equivalent of ammonia ($NH_3$) excreted by the fish gills when converted to the ammonium ion ($NH_4^+$) at pH close to neutral, at which the pond is typically operated. Nitrification consumes approximately two equivalents of alkalinity per mole of oxidized ammonium. Thus, in RAS employing a nitrification unit, one equivalent of alkalinity is lost per mole nitrogen excreted by the fish. In high-density cultures, this alkalinity loss can lead to the elimination of the water buffer capacity, which may result in a pH drop, which in turn increases the $CO_{2(aq)}$ concentration and also hinders nitrification, causes ammonia to accumulate, and may finally result in fish death. In order to avoid this scenario, a strong base such as sodium hydroxide (NaOH) or a weak base such as sodium bicarbonate ($NaHCO_3$) is usually added to the system. Alternatively, the make-up water flow rate can be increased or the effluents of a denitrification reactor can be recycled back into the pond.

The advantages of RAS over extensive and net pen aquaculture are well known. However, to date, available RAS technologies suffer from several limiting factors which restrict their wide application: (1) difficulty in meeting desired environmental standards, namely related to inefficient removal of nitrogen and phosphorus compounds; and (2) bio-filter limitations, such as temperature dependency, possible amplification of pathogens and harboring of microorganisms responsible for generation of off flavor in the fish. These factors result in increased production costs due to environment-related expenses and low product-quality fees, fish health issues affecting growth and survival performance, and high capital costs (particularly apparent in cold-water fish RAS, which require large bio-filter surface areas).

RAS technologies that rely on physical-chemical water treatment (more specifically, indirect electrooxidation of the TAN generated in the pond) have been recently suggested (Diaz et al., 2011; Gendel and Lahav, 2013).

WO 2012/066654 to some of the inventors of the present invention teaches processes for removing ammonia from fresh or saline water RAS while maintaining a total ammonia nitrogen (TAN) concentration in the water of the system between 15 and 50 mgN/L. The process for saline water includes (a) maintaining the pH of the water in the RAS below 7.5 (preferably between 6.5 and 7.5); (b) extracting a portion of the water from the RAS; (c) oxidizing the ammonia in the portion of the water to nitrogen gas by electrochemical treatment or by breakpoint chlorination in the presence of a solution comprising $Cl_2$ at concentrations required for attaining breakpoint chlorination; and (d) optionally, repeating steps (a) to (c) in a continuous manner, as needed. During the electrolysis step, in order to prevent a pH drop, a strong base is added, and the pH value is maintained constant at about 6.0-6.5.

SUMMARY OF THE INVENTION

The present invention relates to physico-chemical processes for continuous and simultaneous water disinfection, oxidation of off flavor agents, minimization of trihalomethane (THM) production, reduction of nitrate and nitrite production and oxidation of ammonia so as to completely remove nitrogen species, in seawater and other saline-based aquaculture systems. The aquaculture system may be any handling/storage/transport system, e.g., recirculated aquaculture systems (RAS), for fish or other aquaculture species.

WO 2012/066654 teaches processes for removing nitrogen species from fresh water or high salinity water RAS, which includes an indirect electrolysis step (carried out in a tank separated from the fish tank water) to oxidize ammonia to nitrogen gas. Indirect ammonia electrooxidation refers to electrooxidation of chloride ions to chlorine species which oxidize the ammonia to $N_{2(g)}$. During the electrolysis step, in order to prevent a pH drop, a strong base is added, and the pH value is maintained constant at about 6.0-6.5. In contrast, the present invention is based on the unexpected discovery that careful control of the pH during the electrolysis step to a pH at or below about 4.0 (e.g., by addition of a strong acid), enables not only to achieve efficient ammonia removal, but also provides an extremely efficient disinfection system (i.e., removal of micro-organisms, among them pathogenic microorganisms and nitrifying bacteria, thereby minimizing both fish disease and the formation of nitrite and nitrate in the pond water), minimizes formation of trihalomethanes (which are known to be carcinogenic and have the potential to adhere to the fish flesh), and minimizes or eliminates (via oxidation/degradation) compounds responsible for off-flavor in the fish. Another advantage of the process of the present invention is the significant saving in the amount of strong base and strong acid added to the electrolysis tank and fish pond, respectively: no base is added at all, and since the acidity formed in the electrolysis step is recycled to the fish pond, the amount of strong acid required is only a fraction of the amount required according to WO 2012/066654. According to the principles of the present invention, the electrolysis tank may be acidified only at the beginning of the process (from the pH in the pond down to pH≤4). Thereafter, the system acidifies itself because the electro-oxidation of ammonia is an acidic reaction which maintains the pH at the desired range.

Thus, according to the principles of the present invention, the electrolysis-based water treatment system is operated at pH≤4 (and most of the time at pH<3). These conditions combine efficient oxidation of ammonia and organic matter along with efficient elimination of microorganisms, including pathogenic bacteria, protozoa and viruses. Additionally, the electrolysis step further results in minimization of trihalomethane (THM) formation, which are known to be carcinogenic. For example, the process of the invention minimizes the formation of bromoform ($CHBr_3$), a carcinogenic molecule which tends to accumulate in the fatty tissues of fish. Furthermore, under the conditions prevailing in the electrolysis tank oxidation of the main chemicals responsible for off-flavors in fish (e.g., geosmin (GSM) and 2-methylisoborneol (2-MIB)) occurs efficiently along with destruction of the microorganisms (bacteria and microalgae) that release them to the water as part of their metabolism. This is significant, since off flavor results in heavy loss for facilities either due to low quality product or by necessitating a special purging component which consumes high water volumes and results in loss of already produced aquaculture biomass. Furthermore, the elimination of nitrifying bacteria in this step results in minimization of later formation of unwanted nitrate ($NO_3^-$) and nitrite ($NO_2^-$) due to unwanted nitrification in the aquaculture tank. Moreover, as contemplated herein, the circulation of the water through the electrolysis tank can be efficiently controlled so as to satisfy both the disinfection/oxidation goal (e.g., by adjusting the rate of water recirculation), and the TAN removal goal.

Thus, in one embodiment, the present invention provides a process for the removal of ammonia from a saline aquaculture system, the process comprising the steps of: (a) maintaining the pH of the water in the saline aquaculture system below about 7.5; (b) extracting a portion of the water from the system; (c) oxidizing the ammonia in the portion of the water to nitrogen gas by electrolysis, at a pH at or below about 4.0; and (d) optionally, repeating steps (a) to (c) in a continuous manner, as needed. A general embodiment of the process of the invention is depicted in FIG. 1, which is described hereinbelow.

The total ammonia nitrogen (TAN) concentration in the water of the aquaculture system may be maintained between about 10 and about 100 mgN/L. In one embodiment, the TAN concentration in the water of the aquaculture system is maintained between about 15 and about 65 mgN/L. In another embodiment, the TAN concentration in the water of the aquaculture system is maintained between about 15 and about 50 mgN/L.

Advantageously, in addition to removing nitrogen, the electrolysis step in the process of the invention further results in disinfection of the water from micro-organisms, among them pathogenic microorganisms and nitrifying bacteria, thereby minimizing both fish disease and the formation of nitrite and nitrate in the pond water. Thus, according to one embodiment, the present invention provides a method for disinfecting an aquaculture system, by (a) maintaining the pH of the water in the saline aquaculture system below about 7.5; (b) extracting a portion of the water from the system; (c) oxidizing the ammonia in the portion of the water to nitrogen gas by electrolysis, at a pH at or below about 4.0; and (d) optionally, repeating steps (a) to (c) in a continuous manner, as needed, wherein the electrolysis step (c) results in disinfection of the water in the aquaculture system.

Furthermore, the process further comprises reducing the concentration of chemical species responsible for off-flavors in aquaculture species contained in the system (e.g., fish). Examples of chemicals responsible for off-flavors are geosmin (GSM) and/or 2-methylisoborneol (2-MIB). Thus, according to one embodiment, the present invention provides a method for reducing the concentration of chemical species responsible for off-flavors in aquaculture species in an aquaculture system, by (a) maintaining the pH of the water in the saline aquaculture system below about 7.5; (b) extracting a portion of the water from the system; (c) oxidizing the ammonia in the portion of the water to nitrogen gas by electrolysis, at a pH at or below about 4.0; and (d) optionally, repeating steps (a) to (c) in a continuous manner, as needed, wherein the electrolysis step (c) results in reduction in the concentration of chemical species responsible for off-flavors in aquaculture species in the aquaculture system.

Additionally, the electrolysis step further results in minimization of trihalomethane (THM) formation, which are known to be carcinogenic. In one preferred embodiment, the THM concentrations are lowered to values below about 100 ppb. Thus, according to one embodiment, the present invention provides a method for reducing or minimizing the levels of trihalomethanes (THM) in an aquaculture system, by (a) maintaining the pH of the water in the saline aquaculture system below about 7.5; (b) extracting a portion of the water from the system; (c) oxidizing the ammonia in the portion of the water to nitrogen gas by electrolysis, at a pH at or below about 4.0; and (d) optionally, repeating steps (a) to (c) in a continuous manner, as needed, wherein the electrolysis step (c) results in reduction or minimization of trihalomethane (THM) formation in the aquaculture system.

Moreover, the process of the invention advantageously results in the reduction of (toxic) nitrate and/or nitrite production as a result of the disinfection step which reduces the amount of nitrifying bacteria in the aquaculture system. Thus, according to one embodiment, the present invention provides a method for reducing or minimizing reduction of nitrate and/or nitrite formation in an aquaculture system, by (a) maintaining the pH of the water in the saline aquaculture system below about 7.5; (b) extracting a portion of the water from the system; (c) oxidizing the ammonia in the portion of the water to nitrogen gas by electrolysis, at a pH at or below about 4.0; and (d) optionally, repeating steps (a) to (c) in a continuous manner, as needed, wherein the process results in the reduction of (toxic) nitrate and/or nitrite production as a result of the disinfection step/electrolysis which reduces the amount of nitrifying bacteria in the aquaculture system.

The aquaculture system may be any saline-water (e.g., seawater) containing system used to rear (grow) or transport aquaculture species. In one preferred embodiment, the aquaculture system is a high salinity (e.g., seawater) RAS. However, the present invention is applicable to any fish/other aquaculture rearing, transport of handling apparatus. In some embodiments, the aquaculture system may be selected from the group consisting of an aquaculture species pond, an aquaculture species pool, an aquaculture species container, an aquaculture species tank, and a live an aquaculture species transportation apparatus. For example, the aquaculture system may be selected from the group consisting of a fish pond, a fish pool, a fish container, a fish tank, and a live fish transportation apparatus. Each possibility represents a separate embodiment of the present invention.

The process of the present invention is applicable to any aquaculture species, including but not limited to fish, shrimp, prawns, mussels, oysters, crab, lobster, scallop, conch and eel.

Optionally, this process can be conducted in a continuous manner wherein steps (a-c) are repeated as necessary and at the desired frequency. In some embodiments, steps (b) and (c) are performed continuously.

In some embodiments, the oxidized water or a portion thereof is recycled back to the aquaculture system.

In a preferred embodiment of the invention, electrolysis step (c) is conducted in a tank isolated from the pond, to prevent chlorine and chloramines from reaching to rearing water during TAN oxidation. Moreover, the water that is pumped back to the fish tank following the electrooxidation step preferably undergoes de-chlorination for complete reduction of chlorine species (which are toxic to the fish). De-chlorination can be carried out using sodium thiosulfate or sodium sulfite or like reagents.

In some specific embodiments of the process of the invention, steps (b) and (c) comprise: (i) extracting a first portion of the water from the system to a first container; (ii) transferring the water from the first container to an electrolysis unit and electrolyzing/disinfecting the water; (iii) extracting a second portion of the water from the system to a second container, wherein steps (ii) and (iii) are optionally performed simultaneously; (iv) recycling the product of step (ii) to the aquaculture system; (v) transferring the water from the second container to an electrolysis unit and electrolyzing/disinfecting the water; (vi) recycling the product of step (v) to the aquaculture system; and (vii) optionally, repeating steps (i) to (vi) in a continuous manner. In a preferred embodiment, the water obtained in steps (iii) or (v) is transferred to a separate container for dechlorination prior to being recycled back to the aquaculture system. The first and second containers may be any apparatus that is able to hold water, for example a water tank. This embodiment of the process of the invention is described in FIG. 2, which is depicted hereinbelow.

In some embodiments, a strong acid is added to the electrolysis tank in order to maintain the pH at or below 4.0. In various embodiments, the acid is $H_2SO_4$. In other embodiments, the acid is HCl. The acid may be added to the electrolysis tank prior to or simultaneously with transfer of the water from the aquaculture system.

The pH of the aquaculture system (e.g., RAS) is maintained below about 7.5. The pH in the aquaculture system can mostly be controlled by recycling the (acidic) oxidized water back to the rearing pond as explained in the detailed description. However, if required or desired, a small amount of strong acid may be added directly to the aquaculture system. In various embodiments, the acid is $H_2SO_4$. In other embodiments, the acid is HCl.

In additional embodiments, the pH of the aquaculture system is further maintained by stripping of $CO_2$, wherein stripping of $CO_2$ comprises the addition of pure oxygen or aeration or the use of stripping towers.

In one preferred embodiment, the process of the present invention comprises an efficient solids separation step to ensure that the solids retention time in the fish pond will result in minimum growth of autotrophic bacteria (i.e. nitrifying bacteria) population in the fish tank water. Nitrifying bacteria are unwanted in the rearing water since they oxidize ammonia to nitrite (which is toxic to the fish) and nitrate. Solids are removed by passing a portion of the water from the aquaculture system through a solid separation unit prior the electrolysis step. The solid separation step may optionally be repeated in a continuous manner by recycling the water back to the aquaculture system.

The present invention further provides an apparatus for continuous and simultaneous water disinfection, oxidation of off flavor agents, minimization of trihalomethane (THM) production, reduction of nitrate and nitrite production and oxidation of ammonia so as to remove nitrogen species, in seawater or other saline-based aquaculture systems. Examples of suitable apparatus are depicted in FIGS. 1 and 2 herein.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Process Description

For a better understanding of the invention and to show how it may be carried into effect, reference will now be made, purely by way of example, to the accompanying drawings. With specific reference now to the drawings in detail, it is stressed that the particulars shown are by way of example and for purposes of illustrative discussion of the preferred embodiments of the present invention only, and are presented with the purpose of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice.

Figure 1:
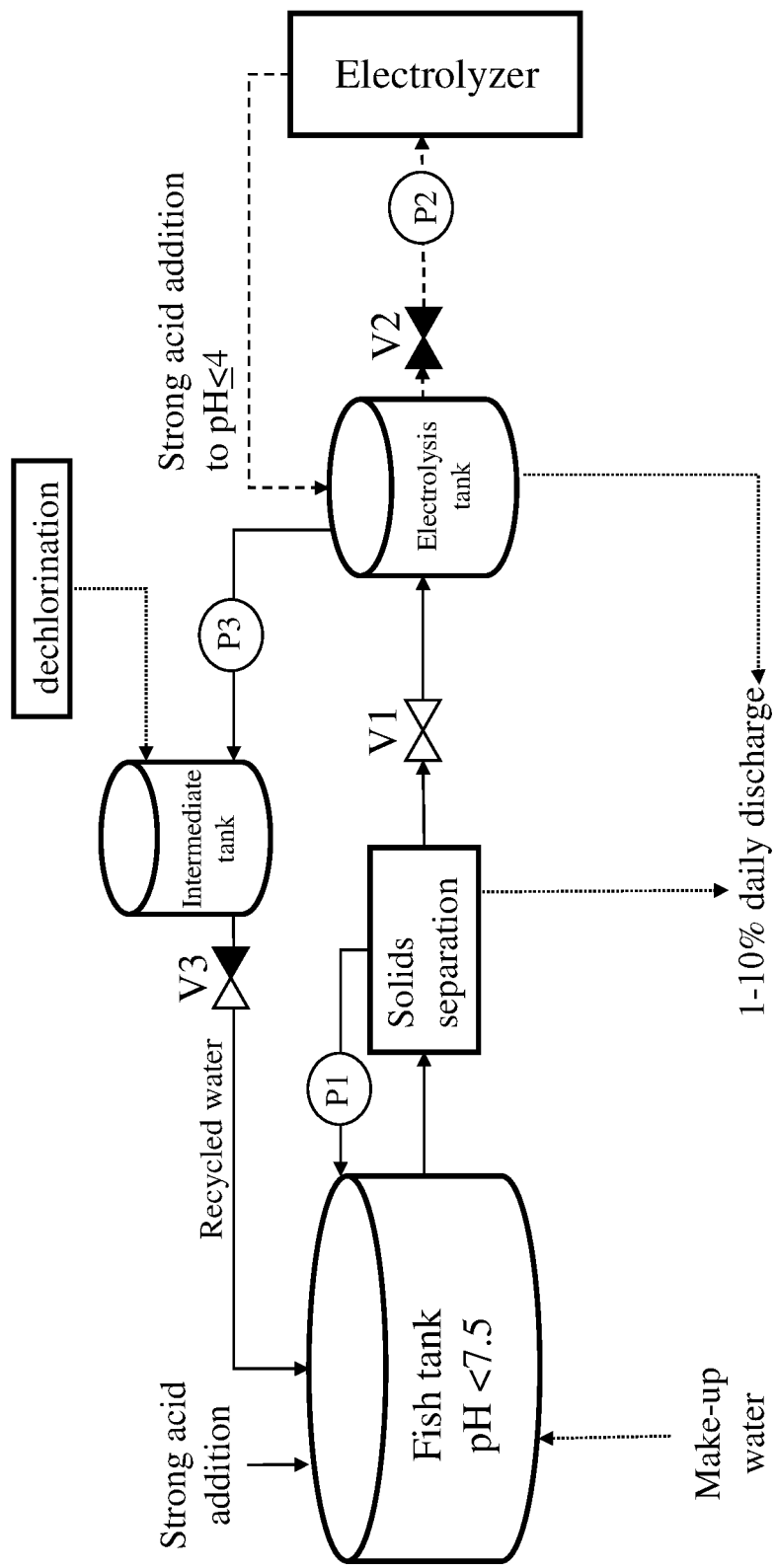
FIG. 1. Schematic representation of the process of the present invention. Full valve (V) symbol refers to closed valves while empty symbols refer to open valves. The symbol P refers to pumps. Only one from V1, V2 and P3 can be open/on at a given time. V1—when filling the electrolysis tank; V2—during electrolysis; P3—while emptying the electrolysis tank. V3 is closed when P3 is emptying the electrolysis tank, and open at will after dechlorination.

The process of the present invention is described schematically in FIG. 1. The water flowing out of the fish tank is transferred to an electrolysis tank, and undergoes low-pH (pH≤4.0) batch-mode electrolysis, in which the TAN concentration is oxidized to $N_{2(g)}$ by chlorine species formed on the anode due to electrooxidation of $Cl^-$ present in the rearing water. During the electrolysis period, in particular due to the low pH environment, highly disinfecting conditions are formed, practically eliminating all the microorganisms present in the water. Once the electrolysis step is terminated, the disinfected water (which has now also a lower TAN concentration) is predominantly (90% to 99%) returned to the fish pond. In one preferred embodiment, prior to being returned to the pond, the disinfected water is transferred to an intermediate tank and undergoes a de-chlorination step (chlorine species reduction to $Cl^-$ by reagents such as sodium thiosulfate or sodium sulfite) to ensure that no residual chlorine/chloramine species would come into contact with the grown species (fish/shrimp/eels, etc.).

Figure 2:
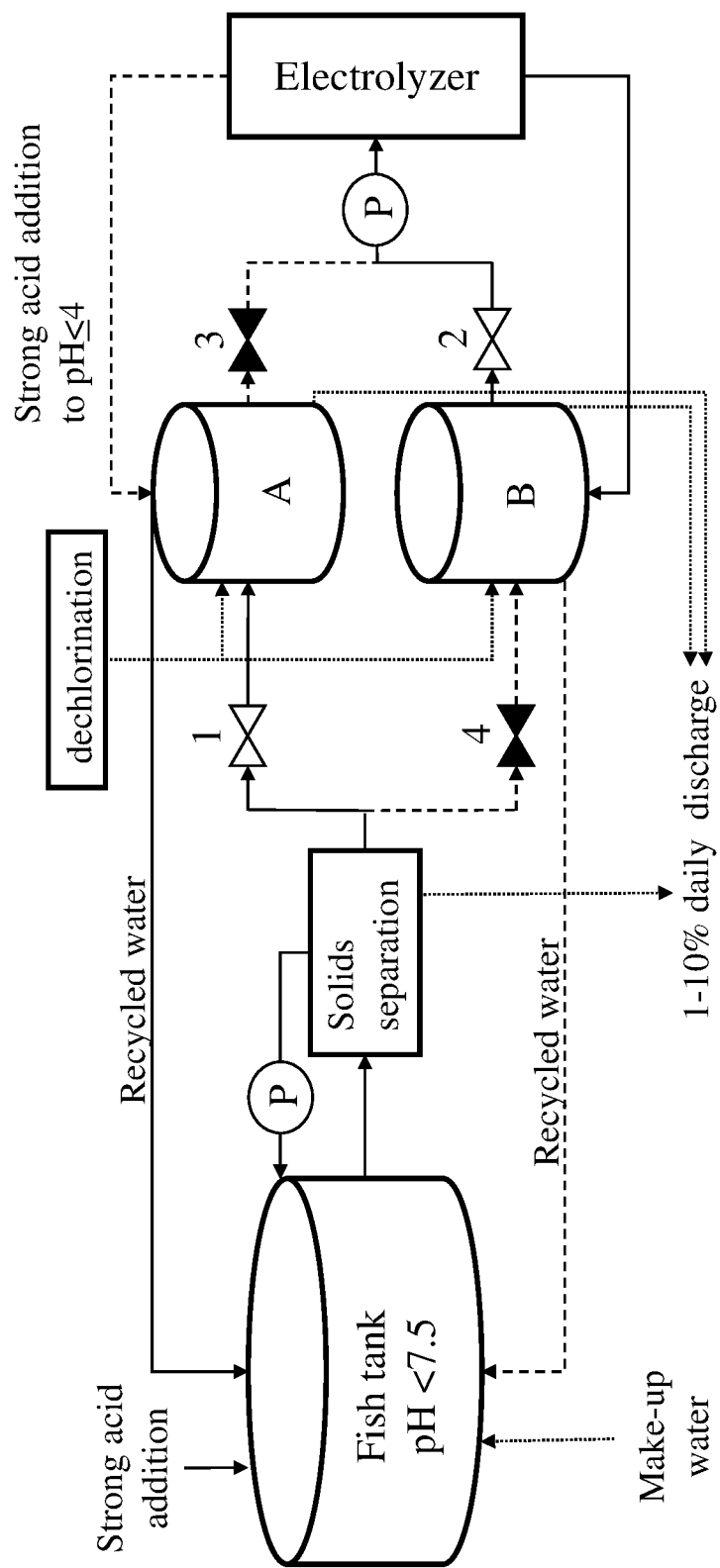
FIG. 2. Schematic representation of a specific embodiment of the process of the present invention. A and B are intermediate tanks, operating alternately as electrolysis or water receiving tanks. Full valve symbol refers to closed valves while empty symbols refer to open valves. For example, tank B in FIG. 2 is conducting electrolysis.

A more specific, but non-limiting embodiment of the process of the invention is described schematically in FIG. 2. The water flowing out of the fish tank is collected in two receiving tanks (designated A and B in FIG. 1). Once a receiving tank (e.g., tank A) is full, it is disconnected from the fish pond and undergoes low-pH (pH≤4.0) batch-mode electrolysis, in which the TAN concentration is oxidized to $N_{2(g)}$ by the chlorine formed on the anode due to electrooxidation of $Cl^-$ present in the rearing water. During the electrolysis period, in particular due to the low pH environment, highly disinfecting conditions are formed, practically eliminating all the microorganisms present in the water. During the electrolysis period the flow from the pond is directed to the second receiving tank (tank B). Once the electrolysis step is terminated, the disinfected water (which has now also a lower TAN concentration) is predominantly (90% to 99%) returned to the fish pond. In one preferred embodiment, prior to being returned to the pond, the disinfected water undergoes a de-chlorination step (chlorine species reduction to $Cl^-$ by reagents such as sodium thiosulfate or sodium sulfite) to ensure that no residual chlorine/chloramine species would come into contact with the grown species (fish/shrimp/eels, etc.).

In one preferred embodiment, the process of the present invention (as depicted, e.g., in FIGS. 1 and 2, comprises an efficient solids separation step to ensure that the solids retention time in the fish pond will result in minimum growth of autotrophic bacteria (i.e. nitrifying bacteria) population in the fish tank water. Nitrifying bacteria are unwanted in the rearing water since they oxidize ammonia to nitrite (which is toxic to the fish) and nitrate. Solids removal from RAS systems is generally known, however it is especially advantageous in the process of the invention, due to the reduction of nitrifying bacteria present naturally in the pond water, thereby reducing unwanted nitrification products.

Mass wise, the electrolysis step in the process of the invention is operated to remove the exact daily mass of TAN released by the fish, thereby maintaining a constant (high) TAN concentration in the fish pond.

In the process described by WO 2012/066654, the electrolysis step is conducted at pH of 6.0-6.5. Since the electrolysis step produces acid, a strong base is added to the electrolysis tank in order to maintain this pH range. At this pH range, the disinfection of the water is less efficient, as the main disinfecting species are HOCl and OCl$^-$ rather than $Cl_2$ and $Cl_3^-$ and the pH conditions themselves do not lead to microorganisms death, as opposed to pH≤4 conditions described by the present invention.

The process of the invention is conveniently performed at ambient temperature, ranging from about 5° C. for cold water fish to about 30° C. for warm water fish.

The process of the present invention maintains high TAN concentration in the rearing water (≥15 mgN/l; typically ≥30 mgN/l, and ≤65 mgN/l), along with relatively low pH (<7.5; typically <7.0), calculated to maintain [NH$_3$] below the concentration toxic to the particular species grown (e.g. 0.1 mgN/l for warm water fish). However, lower or higher TAN concentrations may be used, e.g., from about 10 mg/L to about 100 mg/L, or anywhere in-between. In one embodiment, the TAN concentration is maintained between about 15 mg/l and 65 mgN/L. In one embodiment, the TAN concentration is maintained between about 15 mg/l and 50 mgN/L. Maintaining the total ammonia nitrogen (TAN) concentration at these high concentrations in the absence of biological reactors is possible if the pH is properly controlled. In one particular embodiment, the processes of the present invention are performed while controlling the pH levels in the aquaculture system (e.g., fish tank) at less than about 7.5 and above about 6.0 so as to afford relatively high total ammonia nitrogen (TAN=[$NH_4^+$]+[$NH_3$]) concentrations. For example the pH levels in the aquaculture system may be between about 7.0 and about 7.5, or between about 6.5 and about 7.0, or between about 6.0 and about 6.5, or between 6.5 and 7.5, with each possibility representing a separate embodiment of the present invention. For any given TAN concentration, the pH in the pond is maintained at a value at which the associated $NH_3$ concentration is lower than the value considered detrimental for the growth of fish/shrimp species. Under these conditions, the removal of the detrimental $NH_4^+$ species can be performed with high reliability and without generating any waste streams by means of electrochemical treatment.

Moreover, since the acidity that is produced during the electrolysis cycle is proportional to the TAN concentration, the higher the TAN in the water, the less external acid that will be needed to arrive at a given pH during the electrolysis step. Thus, operating at relative high TAN concentrations as described herein has economic and environmental advantages in that the use of strong acids (in the pond water) and strong base (in the electrolysis step) is minimized and eliminated, respectively.

Control of the pH value in the rearing unit (and the electrolysis tank) can be performed by the addition of a strong acid or/and by controlling the $CO_{2(g)}$ stripping rate. Suitable strong acids include, but are not limited to, $H_2SO_4$ and HCl. Currently preferred is the use of $H_2SO_4$.

The pH in the operating system (i.e., in the pond water and/or the electrolysis unit), and hence the amount of external acid added (if any), depends on the initial TAN and alkalinity concentrations, as well as the composition of the pond water and any make-up water that is introduced into the pond.

For example, when the TAN concentration in the pond is 100 mgN/l, i.e. ~7 mM, then ~7 mM (or meq/l) of $H^+$ are released to the water in the electrolysis step ($H^+$ is released at a 1 to 1 ratio with TAN). The water that comes from the pond typically contains around 30 mg/l as $CaCO_3$ alkalinity (i.e. 0.6 meq/l of alkalinity). Thus 0.6 meq/l $H^+$ will be required to neutralize the alkalinity and further 6.4 meq/l of $H^+$ will be release to the water, which can bring the pH not lower than 2.2 (0.6 meq/l is required to overcome the initial alkalinity, further 1 meq/l is required to drop pH to ~3 and the rest 5.4 meq/l will drop the pH to ~2.2). Throughout the operation, the pH will change from the pond pH (~pH6.4) to pH 2.2. The initial drop (to pH<4) will occur quickly (it will require ~1 meq/l of TAN oxidation) but as the pH drops further the buffering capacity of the water will be such that the majority of the operation will be roughly between pH3.5 and pH2.2.

In another example, in which the TAN concentration in the pond is maintained at ~42 mgN/l (3 mM) the pH drop during electrolysis (pond alkalinity 0.6 meq/l) will be from an initial pH6.7 to pH2.65 due to the electrolysis reactions or, if the pH is rapidly reduced to pH4.0 by addition of external strong acid, then the electrolysis reactions will further reduce the pH value from pH4.0 to pH2.54.

Generally, according to the principles of the present invention, the pH during the electrolysis step is about 4.0 or below. In other embodiment, the pH during the electrolysis step is about 3.5 or below, etc. In other embodiment, the pH during the electrolysis step is about 3.05 or below. In other embodiment, the pH during the electrolysis step between about 3.5 and about 4.0. In other embodiment, the pH during the electrolysis step between about 3.05 and about 4.0. In other embodiment, the pH during the electrolysis step between about 2.5 and about 3.50. In other embodiment, the pH during the electrolysis step between about 2.2 and about 3.50. In other embodiment, the pH during the electrolysis step between about 2.2 and about 3.0. Preferably, the pH value at the end of the electrolysis step will not drop below ~2.2. It is noted that the following the electrolysis step the TAN-devoid water is recycled to the pond after undergoing an optional de-chlorination step, which is also acidic. Thus, the water that is returned to the pond water is very acidic, which assists in maintaining a constant (lower than neutral) pH in the pond because it compensates for the basic reaction cause by the release of $NH_3$ from the fish gills and its transformation in the pond water to $NH_4^+$ while consuming a proton.

For controlling the $CO_{2(g)}$ stripping rate, oxygen can be supplied to the fish in its pure form. Additional methods for controlling the $CO_{2(g)}$ stripping rate include, but are not limited to, aeration and stripping towers. Atmospheric aeration is generally preferred over pure oxygen, due to better $CO_{2(g)}$ stripping capabilities.

In some embodiments, the portion of the water being treated on a given day comprises up to 100% of the aquaculture system (e.g., RAS) water volume. In other embodiments, the portion of the water treated comprises between 1% and 60% of the water volume. In some typical embodiments, the portion of the water treated daily comprises up to 25% of the water volume.

In certain embodiments, the pond is operated as a "closed" system, i.e. with no external water addition apart from compensation for natural evaporation.

In an alternative embodiment of the present invention, ammonia may be oxidized to nitrogen gas by a process known as "breakpoint chlorination". In accordance with this embodiment, high salinity water (e.g., seawater) containing a high $Cl_2$ concentration is added, which results in the oxidation of $NH_4^+$ to $N_2$. The $Cl_2$-rich seawater solution can be formed from in-situ electrooxidation of seawater. In accordance with this option, water flowing out of the aquaculture system (e.g., pond) is electrolyzed to result in a solution which is rich in $Cl_{2(aq)}$. This high chlorine solution is continuously dosed at the required $Cl_2$:$NH_4^+$ molar ratio (typically about ≥1.5) to the ammonia rich water, and ammonia is oxidized to $N_{2(g)}$ via breakpoint chlorination. The term "breakpoint chlorination" as used herein refers to oxidation of ammonia via the external dosage of a $Cl_2$ chemical at a molar ratio typically equal to or higher than 1.5 ($Cl_2$) to 1 (N).

Therefore, in one embodiment, the present invention provides a process for the removal of ammonia from a saline aquaculture system, the process comprising the steps of: (a) maintaining the pH of the water in the saline aquaculture system below about 7.5; (b) extracting a portion of the water from the system; (c) oxidizing the ammonia in the portion of the water to nitrogen gas by breakpoint chlorination in the presence of a solution comprising $Cl_2$ at concentrations required for attaining breakpoint chlorination, at a pH at or below about 4.0; and (d) optionally, repeating steps (a) to (c) in a continuous manner, as needed.

Chemical Reactions in the Electrolysis Tank and Aquaculture System

Electrolysis is applied in the process of the invention directly on the rearing seawater, utilizing the inherently high $Cl^-$ concentration for efficient $Cl_2$ generation close to the anode. Simultaneously, $H^+$ is reduced to $H_{2(g)}$ close to the cathode (Eq. 1). From the inception, strong acid (e.g., HCl or $H_2SO_4$) is added to the electrolyzed solution to reduce pH to ~4 or lower. Since the anodic reaction is acidic, lower pH conditions develop close to the anode, typically lower than pH=2 (Gendel and Lahav, 2012). $NH_4^+$, the dominant ammonia species at low pH, reacts with $Cl_2$ (and probably also with the species $Cl_3^-$, present in the water at considerable concentration at low pH) in a complex set of reactions occurring in three distinct pH zones (very low pH close to the anode, high pH close to the cathode and pH~4 to pH~2.7 in the bulk water), resulting overall in oxidation of TAN to $N_{2(g)}$ (Eq. 2). The complex electrooxidation reactions can be summed up by the overall (dominant) reaction shown in Eq. (3) (Gendel and Lahav, 2012). Eq. (3) results in the release of 1 mole of protons per each mole of $NH_4^+$ oxidized to $N_{2(g)}$. However, since $NH_3$ excreted from the fish gills contributes 1 mole of alkalinity as $OH^-$ (per mole $NH_3$) to the rearing water upon completely transforming to $NH_4^+$ at pH<~7 the alkalinity mass balance can almost be preserved if most of the (acidic) electrolyzed water is returned back to the rearing tank. At such conditions only a small amount of strong acid is required to compensate for acidity losses and maintain stable pH in the rearing water. This strong acid (e.g., HCl or $H_2SO_4$) is mostly added into the electrolysis tank to maintain low pH (pH≤4) throughout the electrolysis period but if required it can be also added directly to the rearing water (FIG. 1 and FIG. 2).

$$2Cl^- + 2H^+ \rightarrow Cl_2 + H_{2(g)} \quad (1)$$

$$3Cl_2 + 2NH_4^+ \rightarrow N_{2(g)} + 6Cl^- + 8H^+ \quad (2)$$

Overall reaction:

$$2NH_4^+ \rightarrow N_{2(g)} + 3H_{2(g)} + 2H^+ \quad (3)$$

Gendel and Lahav (2012) showed that only a small amount of chloramine species is formed when electrolysis is conducted on a low buffering capacity [Cl⁻]-rich water containing a high TAN concentration. Nevertheless, a small residual free and bound chlorine species is invariably present in the water, following the electrolysis step. Such chlorine species may be toxic to the fish at concentrations as low as 0.01-0.08 mg/l. Therefore, in a preferred embodiment of the invention, water from the pone is extracted, and electrolysis is conducted in a tank isolated from the pond, to prevent chlorine and chloramines from reaching to rearing water during TAN oxidation. Moreover, the water that is pumped back to the fish tank following the electrooxidation step preferably undergoes de-chlorination for complete reduction of chlorine species. De-chlorination can be carried out using sodium thiosulfate or sodium sulfite or like reagents, or any other reagent containing reduced sulfur (e.g., solid elemental sulfur).

Batch TAN electrooxidation is a pseudo zero order reaction down to very low ammonium concentrations, in the order of a fraction of mgN/l, and was shown to proceed at very high TAN efficiencies of 85% and above (Lahav et al., 2013). However, the presence of other electron donating species (e.g. organic matter, invariably present in the fish pond water) which can react with chlorine species detracts from the current efficiency of the electrooxidation step. Given that the organic matter concentration in the rearing water is reasonably constant, increasing the TAN concentration in the pond water would result in higher current efficiency in a given batch electrolysis operation. Moreover, maintaining a high TAN concentration in the pond water linearly reduces the volume of the water treatment tanks and thereby the associated capital costs. Maintaining high TAN in the fish pond water typically requires lowering the pH to a point where [$NH_3$] is lower than 0.1 mgN/l. However, low pH shifts the carbonate system towards the toxic $CO_2$ species. This shift also increases the driving force for $CO_2$ stripping and if sufficient aeration is applied, the total inorganic carbon concentration ($C_T$) in the water can be reduced dramatically and so the buffering capacity of the rearing water. Accordingly, in another embodiment, the present process comprises stripping of $CO_2$ wherein stripping of $CO_2$ comprises the addition of pure oxygen or aeration Moreover, applying TAN electrooxidation in water characterized by high TAN concentration results in a significant acidity release and due to the low buffering capacity in significant pH decrease during the electrolysis step (down to pH<2.7). The low pH leads to minimized formation of carcinogenic trihalomethanes (THM), as explained hereinbelow.

Advantages of the Process of the Invention.

Many advantages can generally be listed for operating RAS in the absence of bio-filters, including ease of operation, insensitivity to environmental/operational factors such as temperature and presence of antibiotics, the ability to turn the system on and off at will, the fact that no long startup periods are required, and more (Gendel and Lahav, 2013). Removal of TAN through electrooxidation is also advantageous over conventional nitrification from the mere energy balance standpoint as only three electrons are transferred in the direct conversion of TAN to $N_{2(g)}$ while eight are transferred in conventional nitrification (i.e. only from $NH_4^+$ to $NO_3^-$).

In addition to the general advantages of RAS operating systems known in the art, one specific innovation in the presently claimed invention relates to the low pH conditions at which the electrolysis-based water treatment system is operated. The electrolysis system, which is purposely operated at pH≤4 (and most of the time at pH<3), combines efficient oxidation of ammonia and organic matter along with efficient elimination of microorganisms, including pathogenic bacteria, protozoa and viruses. Under the conditions prevailing in the electrolysis tank, oxidation of the chemicals responsible for off-flavors in the fish (geosmin (GSM) and 2-methylisoborneol (2-MIB)) occurs efficiently along with destruction of the microorganisms (bacteria and micro-algae) that release them to the water as part of their metabolism. This is significant, since off flavor results in heavy loss for facilities either due to low quality product or by necessitating a special purging component which consumes high water volumes and results in loss of already produced aquaculture biomass. Furthermore, the elimination of nitrifying bacteria in this step results in minimization of later formation of unwanted nitrate and nitrite due to biological nitrification in the aquaculture tank. These advantages are further delineated hereinbelow.

There are four main advantages to maintaining pH≤4 in the electrooxidation stage: (i) reduction/minimization of THM formation; (ii) improving the chemical oxidation rate of target organic species responsible for off-flavors in fish (e.g. geosmin and MIB); (iii) improving the disinfection capability; and (iv) no base is required and acid consumption is much lower than in the process of WO 2012/066654.

(i) Reduction in Formation of Trihalomethanes (THM)

According to the principles of the present invention, maintaining low pH in the electrolysis tank is important for minimizing the formation of trihalomethanes (THM) in the rearing seawater, and in particular bromoform ($CHBr_3$).

Seawater contains high concentrations of BP (on the order of 60-75 mg/l), along with very high concentration of Cl⁻. When electrolysis is applied to seawater the free chlorine that is formed close to the anode reacts with water to form hypochlorous acid (HOCl) according to the following reaction (Eq. 4)

$$Cl_2 + H_2O \leftrightarrows HOCl + Cl^- + K = 10^{-4.57} \quad (4)$$

From the equilibrium constant it is apparent that at low pH values the reaction tends to the left and vice versa. Once formed in seawater, HOCl react rapidly with Br⁻ ions to form HOBr according to the following reaction (Eq. 5):

$$HOCl + Br^- \rightarrow HOBr + Cl^- \text{ (fast reaction)} \quad (5)$$

Both HOCl and HOBr can further react with organic matter to produce THM (Eq. 6):

$$HOCl/HOBr + OM \rightarrow CHCl_\alpha Br(3-\alpha) \quad (\alpha = 0-3) \quad (6)$$

Figure 3:
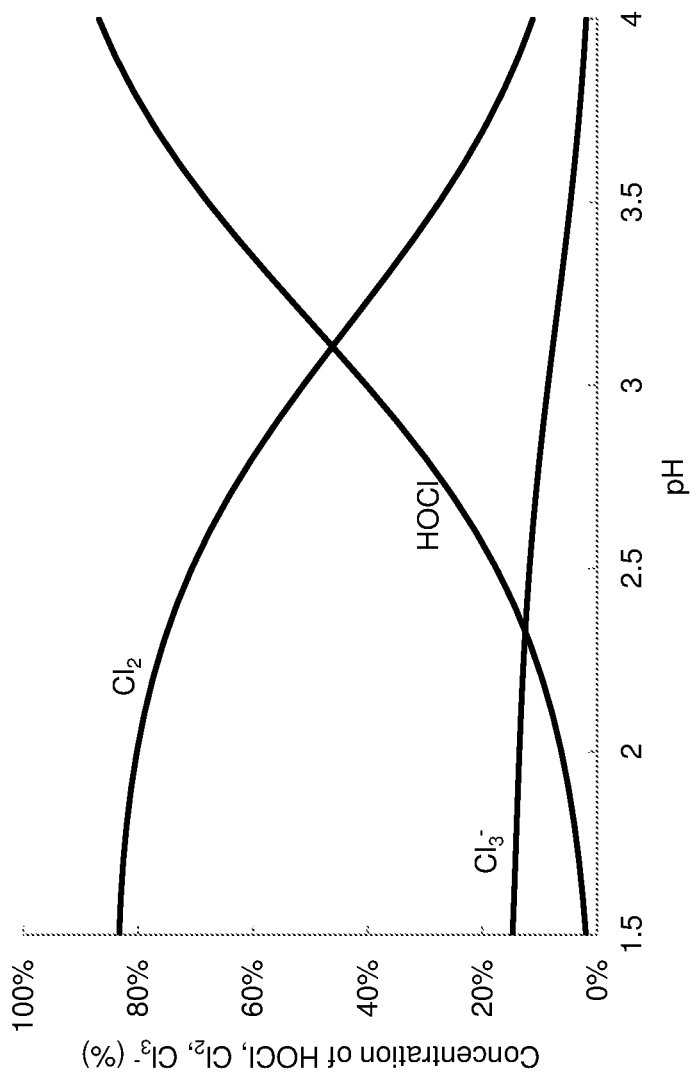
FIG. 3. Fractions of the main active chlorine species ($Cl_{2(aq)}$, $Cl_3^-$ and HOCl) developing in the electrolysis tank as function of pH ($Cl^-$ concentration=21 g/l).

This issue is particularly important since evidence indicates that bromoform, a carcinogenic molecule, tends to accumulate in the fatty tissues of fish. Two main factors dominate THM's generation rate in seawater electrolysis: the composition of organic matter and the rate of chlorine hydrolysis to HOCl. Since the organic matter composition in RAS water is more or less constant, to minimize THM formation, HOCl (and thereby HOBr) generation should be reduced as possible. FIG. 3 shows that applying the electrolysis step at pH<3 minimizes the transformation (hydrolysis) of $Cl_2$ to HOCl (and thus to HOBr), and thereby the main pathway for THM formation (Eq. 6) is impeded.

Figure 7:
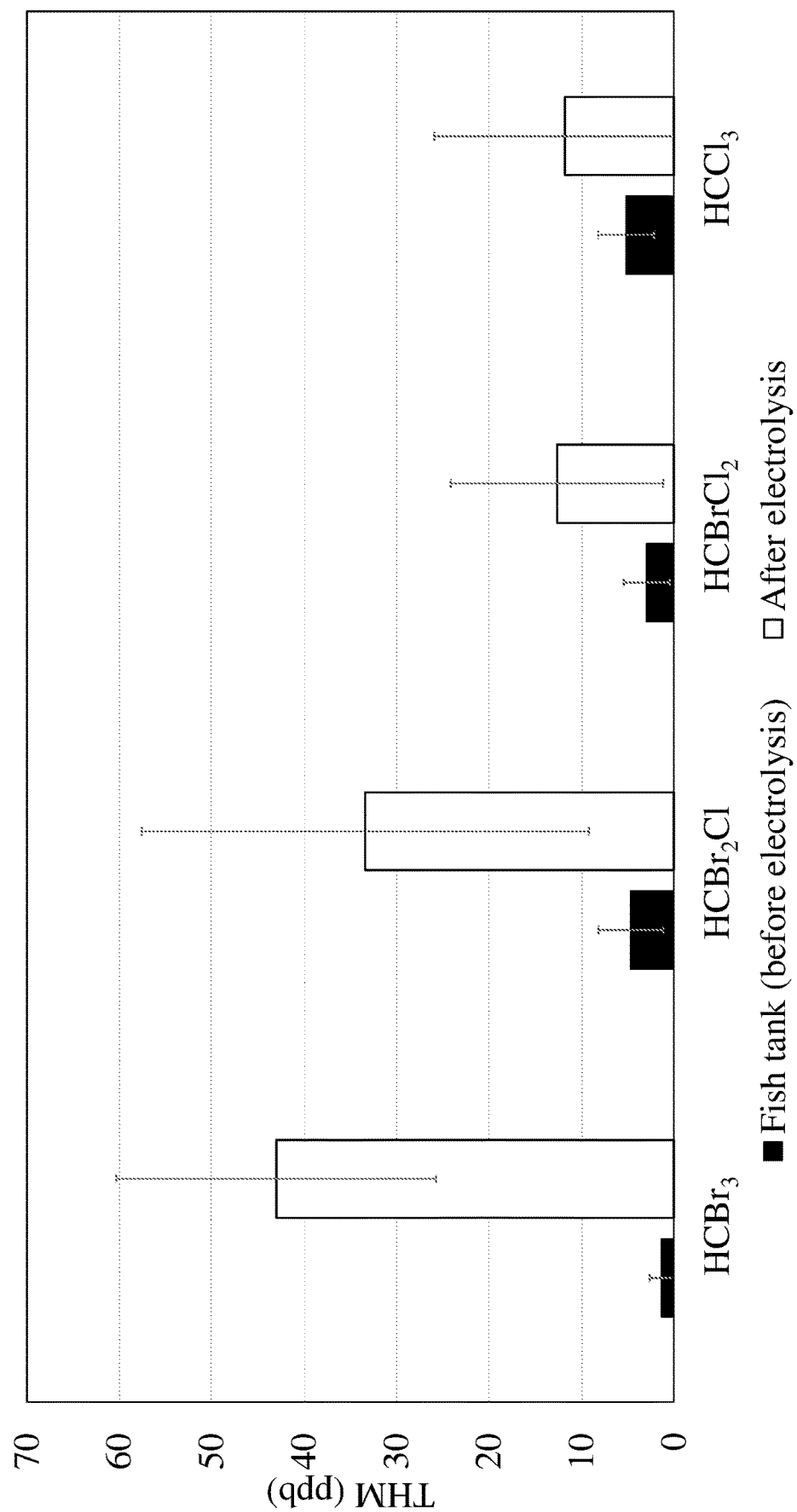
FIG. 7. THM concentrations before and after applying electrolysis of 30 mins on RAS water with TAN ~30 mg/l. Current density=0.157 kA/m$^2$, [$Cl^-$]~21 g/l, [$Br^-$]=22.6 mg/l and BOD~23 mgO$_2$/l. Error bars represent standard deviation. Average Total THM (TTHM) is the sum of the four bars, each representing another type of THM.

The experimental section hereinbelow demonstrates this concept in a 1 m³ pilot scale system of the RAS operated for 5 months (Example 1). Results for THM production are shown in FIG. 7. As shown, the THM concentration forming in the water under low pH conditions (around pH=3 during most of the electrolysis period) were on average compatible with drinking water requirements (which are in most places <100 ppb) and more importantly, the THM concentrations in the pond water were very low. It is noted that the Br⁻ concentration in the water used in the experiments was lower than the typical Br⁻ concentration in the oceans, but also that Br⁻ concentration was not the rate limiting factor for THM generation. Moreover, Example 2 demonstrates that total THM (TTHM) concentration is reduced significantly when the electrolysis step is conducted at low pH (pH=2.0 or 3.0), as compared with an electrolysis reaction conducted at pH=7.

(ii) Degradation of Chemicals Responsible for Off-Flavor in Fish.

Maintaining low pH in the electrolyzed solution is also important for the degradation of the chemicals responsible for off-flavor in fish. Degradation of geosmin and 2-MIB by "conventional" chlorination is reportedly not efficient. For example, Tung and Li (2011) showed that dosage of 10 $mgCl_2/L$ of NaOCl resulted in only 8% removal of 2-MIB (initial MIB concentration 106 ng/L). In contrast, indirect electrochemical oxidation of geosmin was reported to be a highly effective technique, capable of practically completely removing GSM (Li et al., 2010; Xue et al., 2011). This difference in efficiencies of chemical and electrochemical processes can be attributed to the special conditions that exist in the near anode area. Again, low pH that prevails in the anode vicinity results in domination of $Cl_2$ and even $Cl_3^-$ species which are much more powerful oxidizing agents than HOCl and OCl⁻ that dominate in chemical chlorination that is normally conducted at near neutral or slightly alkaline conditions.

As contemplated herein, maintaining low pH in the aquaculture system water that is electrochemically treated (as described herein) enables to achieve high degradation rates of 2-MIB and GSM.

(iii) Disinfection at Low pH

Another significant benefit of applying electrolysis for TAN removal within seawater RAS is the inherent disinfection of microorganisms, obtained in this step. When the pond water is treated in the electrolysis step, microorganisms are exposed to high chlorine concentration for a prolonged period of time. Moreover, since TAN electrooxidation is an acidic reaction, and the buffer capacity in the pond water is low, the pH reduces during the electrolysis to low values (down to pH<3) making the disinfection step exceptionally efficient. This presents another incentive to operate the rearing water with high TAN concentration, because at high initial TAN values the pH at the end of the batch electrolysis step drops to lower values. If required, for example in order to obliterate harmful seawater viruses, the degree of disinfection can be further boosted by maintaining a high residual chlorine concentration for a predetermined amount of time at the end of the electrolysis step, and neutralizing it (by de-chlorination) just before the water is returned to the rearing pond.

Thus, the combination of low pH and the presence of very potent chlorine species at the low pH conditions ($Cl_{2(aq)}$, $Cl_3^-$ and a small percentage of HOCl) results in very efficient disinfection during the electrolysis step.

The combination of lack of biological reactors and effective disinfection is expected to lead to low microbial load in the pond water. Since the largest reservoir of heterotrophic microorganisms in conservative RAS resides in the biofilter, among these pathogens, operation based on the physical-chemical process of the invention can be expected to result in lower morbidity and fish stress in prolonged operation since the presence of pathogens can be expected to be much lower than in RAS systems that use a biofilter.

Moreover, since geosmine and MIB (the main off flavor agents) originate from microorganisms and algae, the presently claimed process is expected to minimize this phenomenon as well. This is significant, since, as explained above, off flavor results in heavy loss for facilities either due to low quality product or by necessitating a special purging component which consumes high water volumes and results in loss of already produced biomass. While open systems suffer from seasonal MIB and geosmin presence, in RAS it can potentially appear year-round due to climate control and high potential accumulation.

Finally, since the electrolyzed water is returned back to the rearing tank, the low pH in the electrolysis step contributes both to the minimizing of the strong acid addition required to maintain low pH in the rearing water and also to the intensive disinfection occurring in this step, which is one of the main advantages of the process of the present invention.

(iv) Reduced Consumption of Acid and Base.

Another advantage of the process of the present invention is the significant saving in the amount of strong base and strong acid added to the electrolysis tank and fish pond, respectively. Specifically, no base is added at all in the process of the invention, as opposed to the process of WO 2012/066654.

Furthermore, since the acidity formed in the electrolysis step is recycled to the aquaculture system (e.g., fish pond), the amount of strong acid required is only a fraction of the amount required according to the process of WO 2012/066654.

It is noted that, according to preferred embodiments of the present invention, the electrolysis tank is acidified only at the beginning of the process (from the pH in the pond down to pH≤4). Thereafter, the system acidifies itself because the electrooxidation of ammonia is an acidic reaction which maintains the pH at the desired range.

Since the acidity that is produced during the electrolysis cycle is proportional to the TAN concentration, the higher the TAN in the water, the less external acid that will be needed to arrive at a given pH during the electrolysis. As indicated herein, a typical TAN concentration in the water of the aquaculture system is between about 10 and about 100 mgN/L, between about 15 and about 65 mgN/L, more preferably between about 15 and about 50 mgN/L. Each possibility represents a separate embodiment of the present invention.

Control of TAN Oxidation/Disinfection

The water circulation between the pond/tank and the electrolysis unit is controlled in the process in such a way that both TAN oxidation and water disinfection/oxidation goals are achieved. Accordingly, in accordance with another embodiment of the present invention, the process of the invention can be manipulated to achieve more efficient water disinfection than ammonia oxidation, or vice versa, depending on the particular needs. Thus, in one embodiment, when more efficient water disinfection is sought, the water circulation rate through the pond is increased and electrolysis is carried out more often, resulting on the one hand in only partial oxidation of TAN (e.g. from 30 mgN/l to 15 mgN/l and not to zero) but on the other hand in higher volume of water that is oxidized per a given time unit. In such case, the system is operated by adjusting the electrical current such that the overall mass of TAN that is oxidized per day equals the TAN released by the fish and thus the TAN concentration in the tank/pond remains steady. Since the water undergoes disinfection events at a greater rate, the overall result is more efficient removal of microorganisms and improved removal of off-flavor agents.

The principles of the invention are demonstrated by means of the following non-limiting examples.

Example 1

In this representative example demonstrating the process of the present invention, gilthead seabream (*sparus aurata*), a high quality seawater fish, was grown for 133 days while closely monitoring its growth performance and health condition. Other factors, such as the alkalinity mass balance, electrooxidation efficiency, the $CO_{2(aq)}$ concentration in the fish tank and formation of THM, were also quantified and reported. As demonstrated hereinbelow, the claimed process is very attractive both from the technical feasibility as well as from the cost effectiveness aspect.

1. Materials and Methods

A pilot scale physical-chemical RAS unit was operated with gilthead seabream for 133 days. The growth period was divided in four: (1) 20 days of adaptation; (2) 75 days of growth at TAN of ~30 mgN/l (Stage 1); (3) 9 days of adaptation; (4) 29 days at TAN of ~65 mgN/l (Stage 2). The water available for the operation was groundwater with ~40% seawater salinity and relative high alkalinity (~250 mg/l as $CaCO_3$). NaCl was added to this water to arrive at [Cl⁻] of ~20 g/l, representative of seawater. A long adaptation period was applied to the fish, which were obtained from a commercial RAS operating with the same groundwater: 3 days for adaptation to a different alkalinity value, 3 days for salinity adaptation, 7 days for TAN accumulation up to 30 mgN/l (during which time pH was reduced gradually to 6.8), and finally 7 days of adaptation at the required steady state.

1.1. Description of the Experimental System 205 gilthead seabream fish were placed in a 750 liter tank. A single recirculating pump, with a flow rate of 2.5 m³/h, supported two water cycles from the fish tank: one cycle of flow through a solids separator unit and the other to two 110 liter intermediate tanks and back to the fish tank. The solids separation unit comprised of a larva net folded six times, which was washed twice a day and disinfected using sodium hypochlorite twice a week. Two intermediate tanks (Tanks A and B in FIG. 2) operated alternately either as a batch electrolysis tank or as a part of the recirculating stream. The TAN electrolysis step was performed in a batch manner by isolating one of the intermediate tanks from the fish tank and performing a side circulation cycle (current density 0.157 kA/m²) through a Klorogen 40 electrolyzer. Both intermediate and fish tanks were pH controlled. pH values were used to determine when to stop the electrolysis and de-chlorination stages. When the intermediate tank was included in the recirculating stream, its pH controller was used as a second pH control in the fish tank. 0.25 N $H_2SO_4$ was dosed directly (upon need) to the fish tank to reduce pH to values of about 6.6-6.8 and maintain $NH_3$ below 0.1 mgN/l. Sodium thiosulfate was used as the dechlorinating agent for reducing chlorine and chloramine species to Cl⁻ following the electrolysis step. The process operated entirely automatically using a Unitronix 130 controller. $O_2$ was supplied by bubbling air into the fish tank using a diffusing pipe. After 18 days pure oxygen was also added during feeding hours, in order to prevent dissolved oxygen (DO) level from dropping below 75% or 6 $mgO_2$/l. Commercial fish food (45% protein) was supplied according to a feeding chart, using 10-h conveyor belt feeder. Up to Day 50 the food was supplied to the fish four times a day. From Day 50 onward the food was given continuously. N-Allylthiourea was added twice a week as a nitrification inhibitor with the aim of maintaining a concentration of ~1 $mgC_4H_8N_2S$/l in the $1^{st}$ stage of the experiment (no addition in the $2^{nd}$ stage).

1.2. Fish Handling and Analyses

The fish used in the experiment were obtained from a commercial RAS at an average weight of 26 g. On the first two days of pre-stage 1 (adaptation) alkalinity was reduced by strong acid addition to ~40 mg/l as $CaCO_3$. The following 48 hours were dedicated to salinity adaptation while pH was reduced gradually to pH 6.8. In parallel, TAN was allowed to accumulate in the water to reach concentrations higher than 20 mgN/l. By the end of the adaptation period, the system was operated for seven more days at steady state before measurements commenced (Stage 1). Histological tests were conducted in comparison to fish from the same batch that grew in a commercial RAS (control). Five fish from the end of Stage 1, Stage 2 and five fish from the Control (commercial system) were collected for full histology: Gills, kidney, spleen, liver and intestine were fixed in 10% neutral buffered formalin solution. The samples were routinely processed in methacrylate and 3 micron thick sections were stained with haematoxylin and eosin (H&E) and in toluidine blue. All sections were examined under a light microscope. Three times during the experiment (twice during Stage 1 and once in Stage 2) two fish were analyzed for wet mount pathology and parasites examinations. Once every 10-16 days ~50% of the fish were weighed. 10 fish from the sample were weighed individually for determining standard deviation. At the beginning and the end of the experiment all the fish were weighed.

1.3 Water Quality Analyses

TAN, nitrate and nitrite samples were taken once a day before and after the electrolysis step. TAN was measured using the salicylate method (https://www.standardmethods.org/) and the $NH_3$ concentration was computed based on measured TAN and pH using the PHREEQC software (Parkhurst and Appelo, 2013). Nitrite and nitrate analyses were performed using colorimetric and cadmium reduction methods, respectively (https://www.standardmethods.org/). Phosphorous (P) was measured from the same samples twice a week using a colorimetric method and [$Cl^-$] twice a month by the AgCl titration method (https://www.standardmethods.org/). Biochemical Oxygen Demand (BOD) in the fish tank was measured with measuring bottles (Oxitop) once a week during Stage 1. The oxygen concentration in the fish tank was measured twice a day. pH continuous measurements were performed at both the intermediate tanks and the fish tank. pH was confirmed at all three points once a day using a manual pH meter. Alkalinity in the fish tank was measured twice a week by the Gran titration, and [$CO_2$] was calculated using salinity, alkalinity, temperature and pH as suggested by Millero et al. (2006). THM were analyzed by GC/MS, using methyl t-butyl ether (MTBE) for extraction.

1.4 Operational and Control Strategy

The recirculating stream was used for both solids separation and for filling the intermediate tank with fish tank water (and simultaneously for recycling the treated water back to the fish tank following de-chlorination). The ammonia electrooxidation batch process was operated as a 5-step cycle. The maximal duration of each step was set periodically according to the operation properties (TAN concentration, feeding load and the current applied in the electrolysis step). In the first step the intermediate tanks were switched, in order to isolate the fish tank from the treated water. In the second step electrolysis was performed. Setting a minimal electrolysis time limitation prevented the electrolysis from terminating before at least 80% of the expected TAN had been oxidized. Since the overall reaction of the TAN electrooxidation results in generation of acidity (Eq. 2), as long as TAN exists in the water the pH during the electrolysis drops. At the end of the electrooxidation run pH increase was observed in the water, coinciding with the time in which all the TAN had been oxidized (likely due to local blending effects). This pH increase was used to control the electrolysis endpoint. In the third step de-chlorination was implemented. The acidic reaction between chlorine/chloramines and thiosulfate is depicted in Eqs. (7) through (10). When all residual chlorine disappears, thiosulfate reacts with $H^+$ according to Eq. (11), resulting in pH increase. This pH change was used to determine the endpoint of the de-chlorination step. Once the de-chlorination step ended the discharge step was initiated. A predetermined treated water volume was discharged out of the system with close to zero TAN, nitrite, BOD and residual chlorine/chloramines concentrations. The rest of the volume was pumped back to the fish pond once the tank was reconnected to the RAS.

$$S_2O_3^{2-}+4Cl_2+5H_2O \rightarrow 2SO_4^{2-}+8Cl^-+10H^+ \quad (7)$$

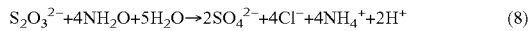
$$S_2O_3^{2-}+4NH_2Cl+5H_2O \rightarrow 2SO_4^{2-}+4Cl^-+4NH_4^++2H^+ \quad (8)$$

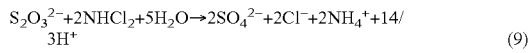
$$S_2O_3^{2-}+2NHCl_2+5H_2O \rightarrow 2SO_4^{2-}+2Cl^-+2NH_4^++14/3H^+ \quad (9)$$

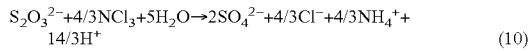
$$S_2O_3^{2-}+4/3NCl_3+5H_2O \rightarrow 2SO_4^{2-}+4/3Cl^-+4/3NH_4^++14/3H^+ \quad (10)$$

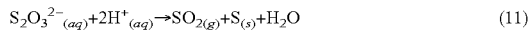
$$S_2O_3^{2-}{}_{(aq)}+2H^+{}_{(aq)} \rightarrow SO_{2(g)}+S_{(s)}+H_2O \quad (11)$$

2. Results and Discussion

Results are divided into two main parts: the performance of the fish and the results of the water treatment component.

2.1. Fish Growth and Health Performance

Results are divided between operational Stage 1, in which the target TAN concentration was ~30 mgN/l and operational Stage 2, in which the fish grew at ~65 mgN/l.

2.1.1. Stage 1 (30 mg TAN/l)

Figure 4:
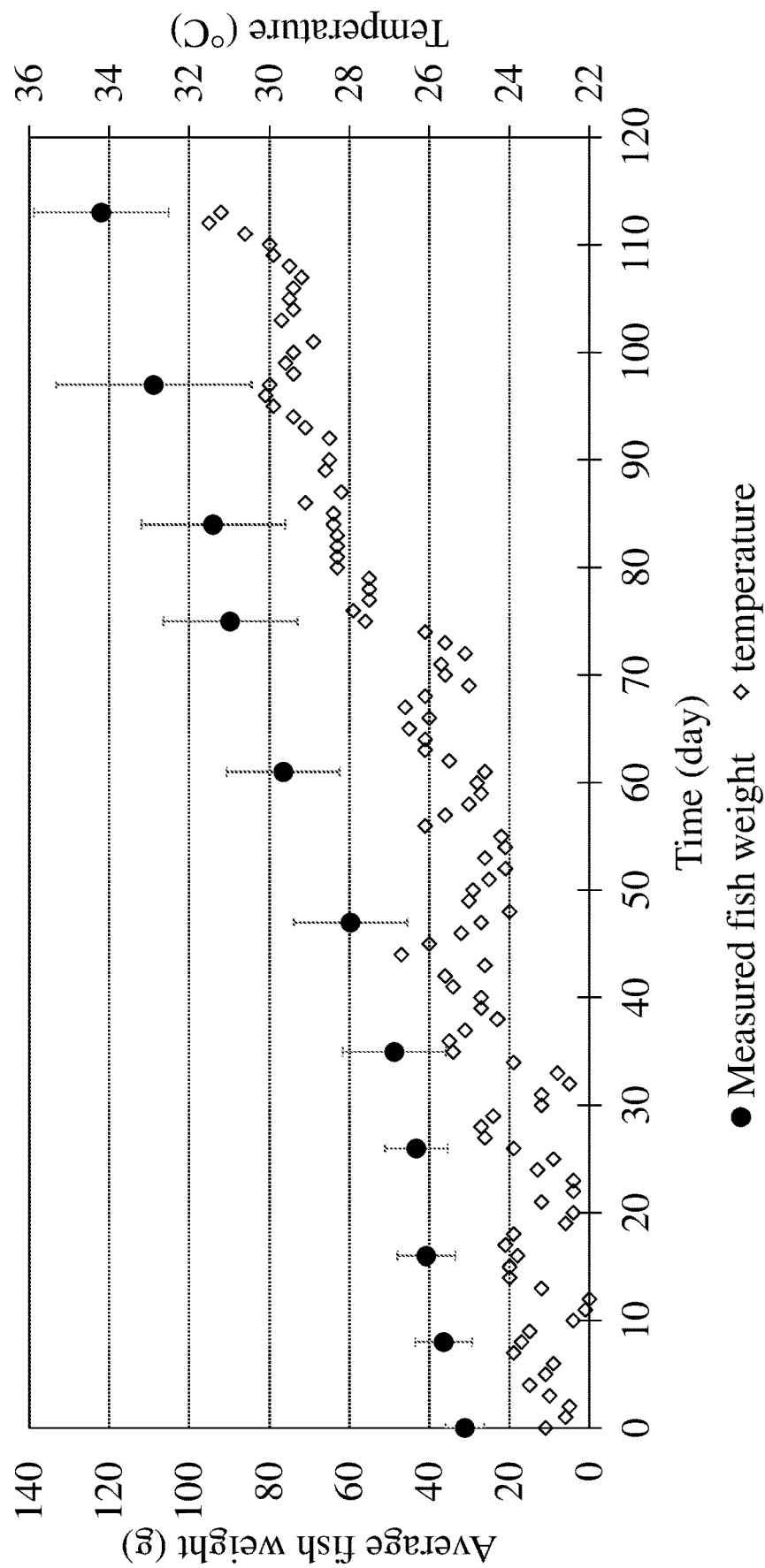
FIG. 4. Growth performance and daily minimal water temperature during the pilot operation. Error bars represent standard deviation. Vertical dashed lines represent end of Stage 1 (Day 75) and beginning of Stage 2 (Day 84). The initial acclimation period is not shown.

FIG. 4 shows the actual seabream growth rate attained in the whole study. The fish survival rate throughout the experiment was 98.5% while all three mortalities were collected after weighing actions, probably due to handling. The fish behavior and motion were absolutely normal, and their appetite was good. Pathological wet mount samples showed normal and clear picture of the gills, intestines, livers and spleens on Day 30 and at the end of Stage 1. Histology analyses conducted at the end of Stage 1 demonstrated mild pathological responses in the gills, intestines, kidneys and spleen (liver structure was found normal), compared to a control sample taken from the commercial RAS. These findings seemed to indicate an environmental effect of some sort (in both the fish from the tested system and the fish from the control). While all common environmental factors were measured routinely and were in the non-toxic range, ammonia, chlorine and chloramine derivatives may be listed as the potential environmental suspects for this mild condition. Since liver pathology was clear the likely conclusion was that the presence of trihalomethanes at low concentrations (see Section 2.3.4.) was not detrimental to the fish.

2.1.2 Stage 2 (65 mg TAN/l)

Stage 2 was conducted at 29.5±0.8° C. (range: 28.4-32.5° C.), which is considered higher than optimal (Gilthead seabream's optimal temperature range is 24-27° C.). Growing fish at temperatures higher than the optimal can lead to thermal stress, resulting in deterioration in growth performance and following prolonged growth periods, even to acute responses. Despite the high temperatures and the fact that the TAN concentration in the pond was as high as 64.1±8.2 mgN/l, the fish continued to eat and grow, and no significant deterioration was observed in pathological findings, e.g. the results of the wet mount pathology were clear.

Table 1 summarizes the performance during the pilot operation (values stand for periodic averages).

TABLE 1

|  | Units | Stage 1 | Stage 2 |
|---|---|---|---|
| Duration | d | 75 | 29 |
| Initial fish count | — | 205 | 196 |
| Initial fish weight | g | 31 | 94 |
| Final average fish weight | g | 90 | 122 |
| Growth rate | g/d | 0.78 | 0.97 |
| SGR | %/d | 1.42 | 0.90 |
| FCR | $Kg_{food}/kg_{fish}$ | 1.57 | 2.08* |
| Survival rate | % | 98.5 | 98.5 |

*Stage 2 feeding rate was ~20% higher than recommended in the feeding chart.

Without any signs hinting to toxicity effects the conclusion was that the slight deterioration in the growth performance was solely a result of the high temperature in Stage 2. According to the commercial feeding chart at 29° C. (which is the highest temperature in the chart) feeding should be reduced by 20% from the ration provided at 27° C. However, the fish were fed the same portion to avoid underfeeding speculations. While the observation was that at temperatures higher than 30° C. the fish enthusiasm for food somewhat declined, the fish always finished the daily amount. Histology examination showed a picture similar to the one obtained from the samples taken at the end of Stage 1.

2.2. Water Quality in Fish Tank

Table 2 shows the water quality values measured in the fish tank throughout the pilot operation. The reported DO values, measured in the mornings, were indicative of the values prevailing during most of the day. DO lowest and temperature highest peaks of the day were recorded about an hour after the last feeding. Oxygen levels were maintained at >6 mgO$_2$/l during all 133 days with one exception on Days 17-21 when oxygen concentration declined to ~4 mgO$_2$/l after feeding. From that event onward, pure oxygen was bubbled in addition to atmospheric air during feeding hours. Temperature results shown in FIG. 4 were measured in the mornings, indicating the minimum daily value. The values at the end of the feeding hours were 0.5-1.3° C. higher than the depicted values. Dissolved orthophosphate concentrations accumulated during all 133 days of operation, reaching a value of ~20 mgP/l when the experiment was stopped. Cl$^-$ concentrations were ~21±0.9 g/l, and alkalinity was measured at 35±4 mg/l as CaCO$_3$ throughout the run. Using the measured pH and alkalinity values the computed CO$_2$ concentration in the pond was 6.15±2.05 mgCO$_2$/l throughout the pilot operation, corroborating the hypothesis that [CO$_2$] can be maintained at a reasonable range despite the low pH, if sufficient aeration is provided.

According to the accepted nomenclature, a near zero discharge RAS is defined as a RAS discharging <5% from the system's volume daily. According to this definition the system was operated as near zero discharge since the measured discharge flow was (on average) 4.8% of the total volume per day.

2.2.1. Stage 1 (30 mgN/l)

Stage 1 commenced when TAN had accumulated to 20 mgN/l. During the first three weeks, TAN was maintained at ~20 mgN/l and then it was increased to ~30 mgN/l for the next 54 days. In order to maintain NH$_3$ at a value <0.1 mgN/l, pH was maintained throughout Stage 1 at pH 6.7, resulting in an average NH$_3$ concentration of 0.044 mgN/l. N-allylthiourea, a nitrification inhibitor used to minimize unwanted NO$_2^-$/NO$_3^-$ formation, was added dry to the fish tank twice a week, to maintain a concentration of ~1 mg/l. Nitrite concentrations, resulting from both partial nitrification and the oxidation of nitrite in the electrolysis step, were relatively stable (3.9±1.1 mgN/l) and nontoxic to the fish due to the high Cl$^-$ concentration in the rearing water. Each steady state operation (defined by a different daily electrolyzed water volume) was characterized by a different, stable, nitrite and nitrate concentrations, indicating that no inorganic N accumulated in the fish tank apart from TAN. The CO$_2$ concentration average throughout Stage 1 was 5.1±0.9 mgCO$_2$/l. [CO$_2$] was at all times lower than 7.0 mgCO$_2$/l, i.e. well within the recommended range for gilthead seabream growth. BOD concentrations during the operation were 23±7 mgO$_2$/l.

2.2.2. Stage 2 (65 mgN/l)

Stage 2 started after a cease of three days in applying the electrolysis step, applied in order to allow the TAN concentration in the pond to arrive at ~60 mgN/l. During this halt, mass balance analyses were performed in the fish pond to quantify the extent of undesired nitrification. The results indicate that 15% to 20% of the NH$_3$ excreted by the fish were oxidized in the pond by nitrifying bacteria. This result appears, to an extent, to be an artifact of the operation at small scale. In a commercial system the surface area available for nitrification biofilms to adhere to would be reduced by a factor of 4-5, thus undesired nitrification can be expected to comprise less than 5% of the NH$_3$ excreted by the fish. The average TAN concentration during Stage 2 was 64.1±8.1 mgN/l. pH was controlled at 6.4 to yield average [NH$_3$] of 0.037 mgN/l. As a result of the low pH, the average CO$_2$ concentration increased slightly to 9.4±2.0 mgCO$_2$/l, which is still in the nontoxic range. The addition of N-allylthiourea was stopped after Day 94, yet the nitrate and nitrite concentrations, which were high at the beginning of this stage, declined to ∥1 mgN/l, indicating that inadvertent nitrification almost ceased at this low pH. Table 2 summarizes the fish tank and water quality during pilot operation. Values represent periodic averages+(standard deviation)

TABLE 2

| Parameter | Units | Stage 1 | | Stage 2 | |
| --- | --- | --- | --- | --- | --- |
| | | Fish tank | Effluent | Fish tank | Effluent |
| Temperature | ° C. | 24.4 (1.3) | | 29.5 (0.8) | |
| DO | mg/l | 7.2 (0.7) | | 7.8 (1.7) | |
| pH | | 6.7 (0.1) | ~3.1 | 6.4 (0.2) | ~2.8 |
| Alkalinity | mg/l as CaCO$_3$ | 35.3 (3.7) | | 35.3 (4.7) | |
| CO$_2$ | mg CO$_2$/l | 5.1 (0.9) | | 9.4 (2.0) | |
| TAN | mg/l | 27.3 (5.0) | 0.8 (1.0) | 64.1 (8.2) | 4.6 (5.2) |
| NH$_3$—N | mg/l | 0.043 (0.008) | | 0.037 (0.012) | |
| NO$_2$—N | mg/l | 3.9 (1.1) | 0.0 (0) | 4.4 (2.9) | 0.0 (0) |
| NO$_3$—N | mg/l | 7.9 (3.1) | 8.6 (1.8) | 9.0 (6.0) | 9.0 (2.3) |
| P | mg/l | 4.4 (3.1) | 5.5 (2.8) | 16.9 (2.1) | 18.7 (3.1) |
| TIN | mg/l | 38.6 (7.8) | 9.2 (2.4) | 74.9 (16.5) | 13.6 (5.9) |
| Cl$^-$ | mg/l | 20449 (868) | | 21164 (995) | |
| BOD Make up water | mg/l | 22.6 (7.1) | 0 (0) | | |
| Flow rate | l/d | 46.6 (13.5) | | 44.9 (27.0) | |
| Effluent | %/d | 4.9% (1.4%) | | 4.7% (2.8%) | |

Figure 5:
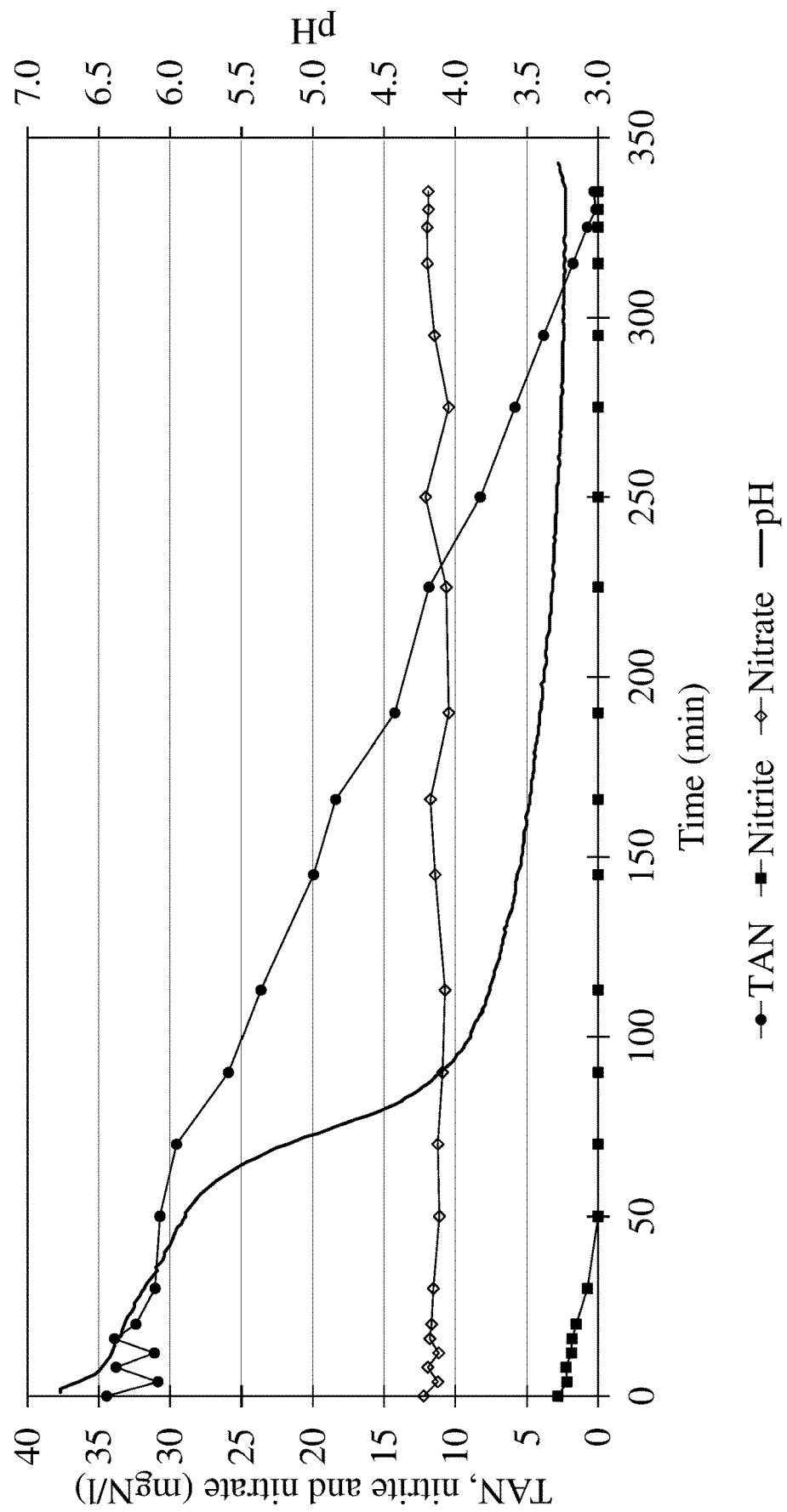
FIG. 5. Typical change in concentrations of inorganic nitrogen species during a typical electrolysis step (applied current density 0.157 kA/m$^2$; 110 liter of RAS water).

2.3. Performance of Electrolysis Unit 2.3.1. Fate of N Species during Electrooxidation FIG. 5 shows a typical electro-oxidation step. As shown, nitrite was the first species to be completely oxidized by the Cl$_2$ generated at the anode. TAN removal followed a pseudo 1$^{st}$ order reaction down to ~0.5 mgN/l. Oxidation to lower concentrations resulted in reduced current efficiency. The nitrate concentration in the fish tank was the result of both unplanned nitrification in the pond and the net removal during the electrolysis step. Initial nitrate concentration of ~8.9 mgN/l resulted in net zero nitrate removal. Stage 1 in the pilot operation showed 77±4% N removal with an average nitrate concentration of 7.9±3.1 mgN/l while in Stage 2 88±3% of the N were removed, with an average nitrate concentration of 9.0±6.0 mgN/l.

2.3.2. pH

The process of the invention entails maintaining relative low pH in the fish pond, which essentially necessitates supplying sufficient $H^+$ mass for converting almost all the $NH_3$ released by the fish to $NH_4^+$. Since the pH of the electrolyzed solution is reduced at the beginning of this step to pH4 by strong acid addition and in the electrooxidation of TAN 1 mole of protons is released per 1 mole of TAN, and since large percentage of the electrolyzed solution is recycled back to the fish pond, most of the required acidity is generated during the electrolysis step and the requirement for strong acid dosage in the pond is minimal. The low pH maintained in the fish tank provides a high driving force for efficient $CO_2$ stripping and also stabilizes the carbonate system concentration at values that are lower than those usually recommended for aquaculture (i.e. alkalinity <50 mg/l as $CaCO_3$). Minimal buffer capacity is recommended in RAS for operational reasons, namely to prevent uncontrolled pH fluctuations. However, in the process of the invention, since pH is anyway strictly controlled, the system can be operated safely with low alkalinity (~35 mg/l as $CaCO_3$). Moreover, since the water reaching the electrolysis tank contained low buffering capacity, the pH reduction during the electrolysis step was significant. After 90-120 minutes of electrolysis (110l, 0.157 $kA/m^2$) the pH dropped below pH3.5. Electrooxidation of 30 and 65 mgN/l of TAN resulted in final pH values of ~3.2 and ~2.8, respectively. Such low pH for long exposure times has the capacity to contribute to the disinfection effect, both on its own and also because the disinfection effect of chlorine species is more pronounced at low pH values.

2.3.3. Current Efficiency

Figure 6:
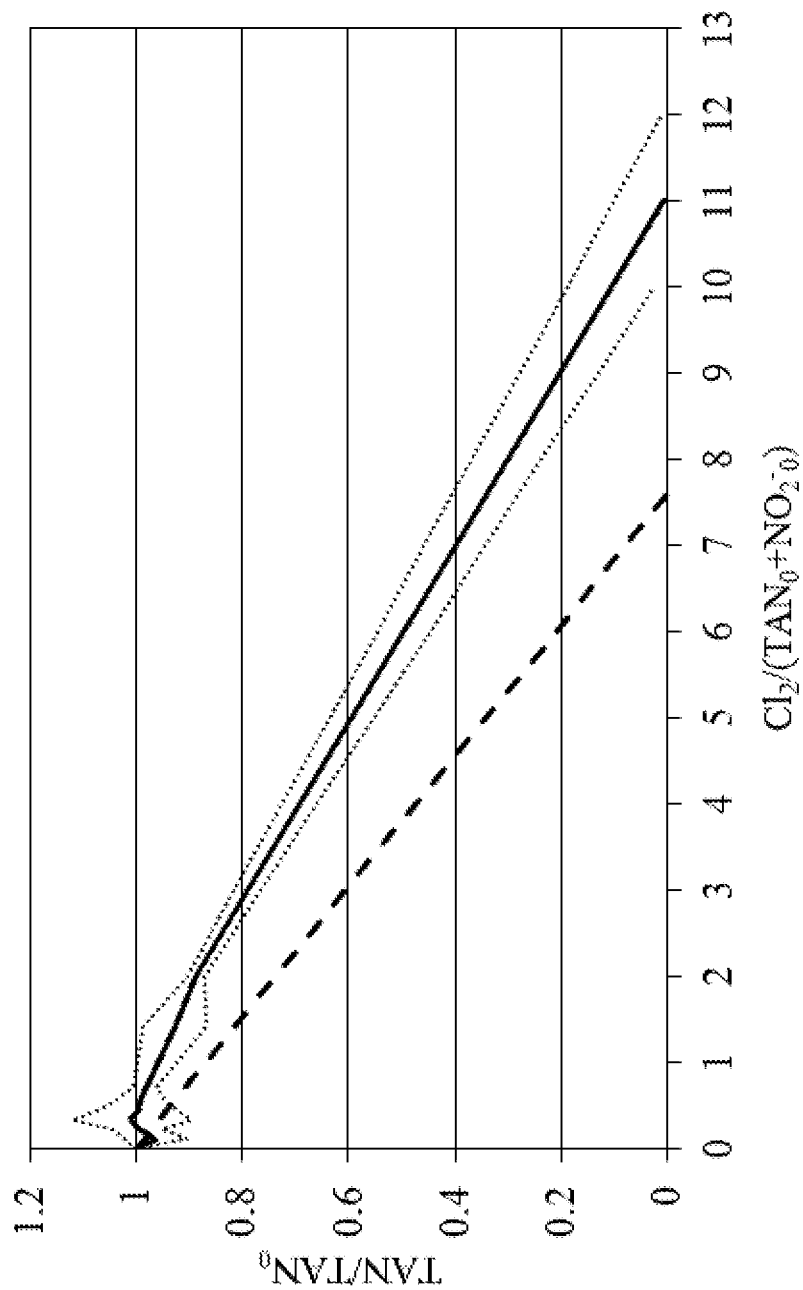
FIG. 6. N removal curve (continuous line) obtained in the electrolysis stage during the pilot operation, as function of the overall applied $Cl_2$:N mass ratio (current density=0.157 kA/m$^2$). Dotted curves show measured standard deviations around the average throughout the runs. The dashed (theoretical) curve, simulating 100% current efficiency, refers solely to ammonia removal. The average $Cl_2$:N mass ratio for 99% ammonia and nitrite removal was 11.1.

Current density of 0.157 $kA/m^2$ was applied in all the electrolysis steps described herein. FIG. 6 shows the drop in the normalized TAN concentration as a function of the ratio between added chlorine and initial TAN present in the water during a typical electrooxidation step. Current efficiency calculations included both nitrite and ammonia removal. Note that nitrite originating in the pond was oxidized in the electrolysis step by chlorine to TAN, which was then oxidized to $N_{2(g)}$. Thus, the presence of nitrite reduced the recorded current efficiency. The applied current density resulted in average current efficiency of ~68% for N removal ($NO_2^-$ to nil and TAN to 0.5 mgN/l). In general, every $Cl_2$ consuming agent reduces current efficiency. In the current case the major factors leading to imperfect current efficiency were $Cl_2$ reduction near the cathode, chlorine reaction with organic matter, nitrate reduction back to $NH_4^+$ leading to higher chlorine demand, $Cl_{2(g)}$ evaporation and chloramine residual concentration at the end of the electro-oxidation step.

2.3.4. THM Formation

THM analyses were performed in the fish pond water before and after electrolysis to assess the amount of THM generated during the electrolysis and its potential accumulation in the fish tank. On average the TTHM (total THM) value that developed in the fish pond was 14 µg/l, while following the electrolysis step an average of ~100 µg/l was recorded. TTHM values <100 µg/l are allowed even in drinking water according to both WHO recommendations and Israeli standards. Without wishing to be bound by any particular theory or mechanism of action, it is contemplated that the low THM formation was a result of the low pH conditions in the bulk water, maintained during the electrolysis step, which minimized $Cl_2$ hydrolysis to HOCl. In typical chlorination applications either the species $Cl_2$ or $OCl^-$ are dosed to the water. These species transform partially or fully into HOCl, which is the dominant chlorine species at the pH range ~3.3<pH<7.5 (at conditions where the $Cl^-$ concentration is ~20 g/l). The formed HOCl reacts preferably with dissolved organic matter to result in formation of chlorinated halomethanes (THM). In seawater, which contains a high concentration of $Br^-$ ions, HOCl tends to transform rapidly to HOBr, which reacts with OM to form brominated halomethanes (Eq. 6). As opposed to chlorination that is carried out by the dosage of external chlorine species to the water, the conditions that form when electrolysis is carried out on low buffering capacity, $Cl^-$-rich solutions dictate a different mechanism. Particularly, the pH value that develops close to the anode, where $Cl_{2(aq)}$ is generated, is much lower (typically pH<2.0) than the bulk solution. The dominant species at these conditions, $Cl_2$, reacts rapidly with the TAN present in solution so the majority of the active chlorine is consumed before $Cl_2$ can be hydrolyzed into HOCl or react with $Br^-$ to form HOBr. According to this sequence of events, when electrolysis is applied on $Cl^-$-rich water characterized by low buffering capacity and low pH (<3.5), as in the electrolysis step according to the present invention, THM formation should be minimized.

FIG. 7 shows results obtained on six random days during the operation of the pilot. Special focus was given to the species bromoform, due to evidence that it may bio-accumulate in the fish fat tissues. The fact that chloroform concentration after the electrolysis was very low (12 µg/l), and much lower than bromoform (43 µg/l), indicates that although [$Br^-$] in the water used in this study was only about 40% from the typical concentration in seawater, the bromide concentration was not the limiting factor for THM formation.

Conclusions

A new seawater RAS operational concept was developed and shown feasible with regard to growth performance and fish health condition.

95% of the excreted nitrogen was removed from the water by electrooxidation while the rearing water was simultaneously disinfected.

Operating the pond at TAN concentration of 30 mgN/l did not show any significant pathological effects on the fish. At TAN concentration of 65 mgN/l the fish grew at a slightly slower rate but this observation coincided with an excessive water temperature. The results corroborated the observation the TAN value by itself is not detrimental to the fish and that by lowering pH fish can grow at very high TAN values.

THM were formed at relatively low concentrations during the electrolysis step, apparently due to the high TAN and low buffer capacity in the rearing water, which resulted in very low pH and suppression of HOCl and HOBr generation.

Example 2—Reduction in Formation of Trihalomethanes (THM) by Maintaining Low pH in Electrolysis Tank Typical organic matter was isolated from a commercial RAS. The organic matter was dried and ground to homogenous powder. This powder was added into 20 liter of seawater following pretreatment that consisted of 2 h in acidified (pH 3) seawater and further 24 h at normal seawater pH (pH 8.1). Ammonia was added to the test solution to achieve ~20 mgN/l. DOC (dissolved organic carbon analysis) was measured before each experiment, to assure constant initial water properties. Electrolysis was applied to this solution (applied current=1 A) at three pH values: 2, 3 and 7 using a Klorogen 10 electrolyzer. The flow rate through the electrolyzer was ~3 l/min. NaOH was added to the water during the electrolysis using a controller and a dosing pump, to maintain constant pH. THM and TAN were sampled throughout the experiment.

Results

Figure 8:
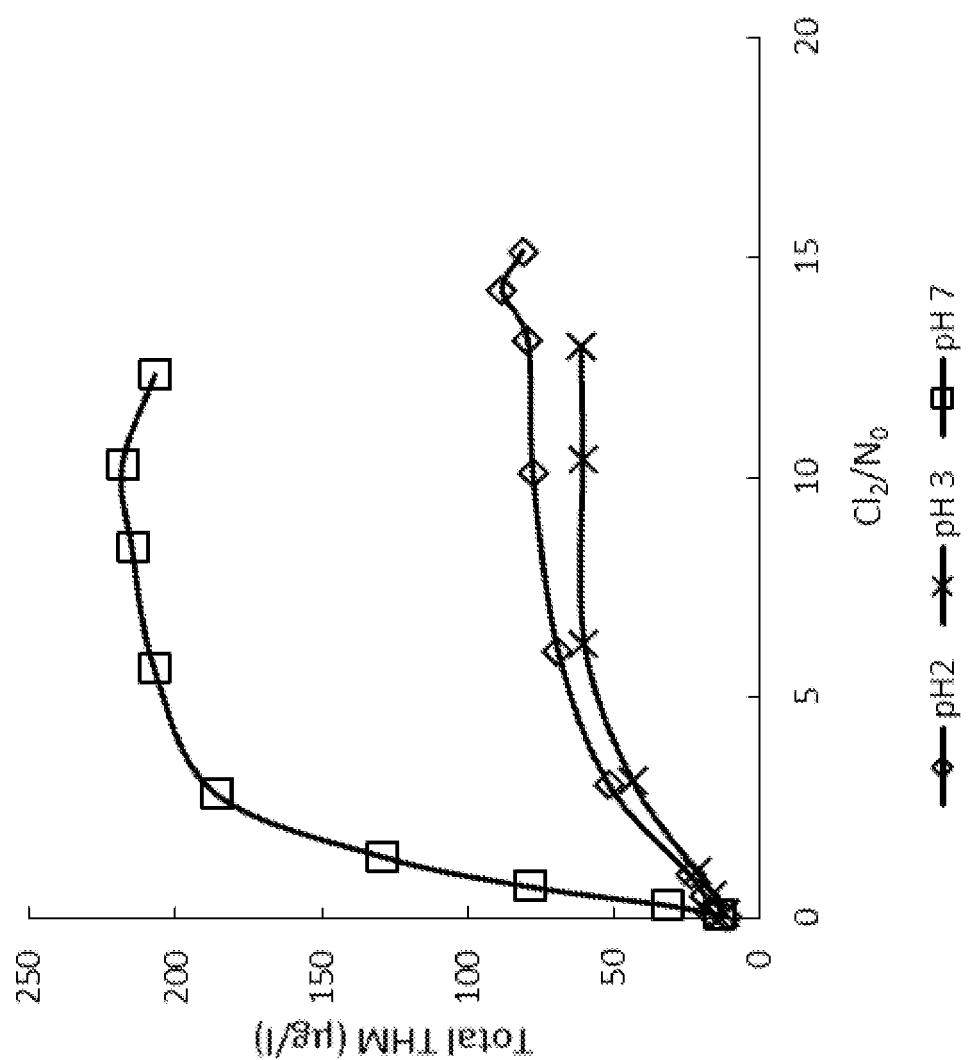
FIG. 8: THM concentration during electrolysis of simulated RAS water at three different pH in the bulk water. Each line represents an average of two experiments.

The DOC measured in the initial water was 24.4±3.5 mgC/l. As can be seen in FIG. 8, pH reduction to pH 3 in the bulk water reduced the TTHM generation by 75%, relative to the results obtained at the neutral pH. This can be explained by shifting Eq. 4 to the left thus minimizing HOCl formation, and thereby less HOBr is formed (Eq. 5). Stated another way, the low pH increases the probability for $Cl_2$ to react with $NH_4^+$ (Eq. 2) before migrating to pH>3.5 zones at which it is almost entirely transformed to HOCl. Further pH reduction to pH 2 showed both lower current efficiency (~15%) and TTHM generation incline (~30%) relative to pH 3, but still resulted in significantly lower TTHM generation as compared with pH=7.

It is appreciated by persons skilled in the art that the present invention is not limited by what has been particularly shown and described hereinabove. Rather the scope of the present invention includes both combinations and subcombinations of various features described hereinabove as well as variations and modifications. Therefore, the invention is not to be constructed as restricted to the particularly described embodiments, and the scope and concept of the invention will be more readily understood by references to the claims, which follow.

REFERENCES

Diaz, V., Ibanez, R., Gomez, P, Urtiaga, A. M., Ortiz, I., 2011. Kinetics of electro-oxidation of ammonia-N, nitrites and COD from a recirculating aquaculture saline water system using BDD anodes. Water Research 45, 125-134.

Gendel, Y., Lahav, O., 2012. Revealing the mechanism of indirect ammonia electrooxidation. Electrochimica Acta 63, 209-219.

Gendel, Y., Lahav, O., 2013. A novel approach for ammonia removal from fresh-water recirculated aquaculture systems, comprising ion exchange and electrochemical regeneration. Aquacultural Engineering 52, 27-38.

Lahav, O., Schwartz, Y., Nativ, P., Gendel, Y., 2013. Sustainable removal of ammonia from anaerobic-lagoon swine waste effluents using an electrochemically-regenerated ion exchange process. Chemical Engineering 218, 214-222.

Li M., Xue Q., Zhang Z., Feng C., Chen N., Lei X., Shen Z., Sigiura N. (2010) Removal of geosmin (trans-1,10-dimethyl-trans-9-decalol) from aqueous solution using and indirect electrochemical method. *Electrochimica Acta.* 55, 6979-6982.

Millero, F. J., Graham, T. B., Huang, F., Bustos-Serrano, H., Pierrot, D., 2006. Dissociation constants of carbonic acid in seawater as a function of salinity and temperature. Marine Chemistry 100, 80-94.

Parkhurst, D. L., Appelo, C. A. J., 2013. Description of input and examples for PHREEQC version 3—A computer program for speciation, batch-reaction, one-dimensional transport, and inverse geochemical calculations. In: U.S. Geological Survey Techniques and Methods, Book 6, Chap. A43. 497 pp. Available at http://pubs.usgs.gov/tm/06/a43/, 2013.

Tung S. C., Li W. J. (2011) Study on oxidation kinetics of dissolved 2-methylisoborneol. Sustainable Environment Research. 21(6), 395-400.

Xue Q., Li, M., Shimizu K., Utsumi M., Zhang Z., Feng C., Gao Y., Sigiura N. (2011) Electrochemical degradation of geosmin using electrode of $Ti/IrO_2$—Pt. Desalination. 265, 135-139.

The invention claimed is:

1. A process for the removal of ammonia from a saline aquaculture system, the process comprising the steps of:
    a. maintaining the pH of the water in said saline aquaculture system below about 7.5;
    b. extracting a portion of the water from said system;
    c. oxidizing the ammonia in the portion of the water to nitrogen gas by electrolysis, at a pH at or below about 4.0; and
    d. optionally, repeating steps (a) to (c) in a continuous manner.

2. The process of claim 1, wherein the total ammonia nitrogen (TAN) concentration in the water of the aquaculture system is maintained between about 10 and about 100 mgN/L.

3. The process of claim 2, wherein the total ammonia nitrogen (TAN) concentration in the water of the aquaculture system is maintained between about 15 and about 65 mgN/L.

4. The process of claim 1, which further results in disinfection of the water during the electrolysis step.

5. The process of claim 1, wherein the saline aquaculture system is a rearing or a transport container for at least one aquaculture species.

6. The process of claim 5, wherein the at least one aquaculture species is selected from the group consisting of fish, shrimp, prawns, mussels, oysters, crab, lobster, scallop, conch, eel and any combination thereof.

7. The process of claim 1, wherein the aquaculture system is selected from the group consisting of a recirculated aquaculture system (RAS), an aquaculture species pond, an aquaculture species pool, an aquaculture species container, an aquaculture species tank, and a live aquaculture species transportation apparatus.

8. The process of claim 1, wherein steps (b) and (c) are performed continuously.

9. The process of claim 1, further comprising the step of recycling at least some of the portion of the water obtained after step (c) back to the aquaculture system.

10. The process of claim 9, further comprising the step of dechlorinating the water obtained after step (c) prior to recycling said water back to the aquaculture system.

11. The process of claim 1, wherein steps (b) and (c) comprise:
    (i) extracting a first portion of the water from said system to a first container;
    (ii) transferring the water from the first container to an electrolysis unit and electrolyzing said water;
    (iii) extracting a second portion of the water from said system to a second container, wherein steps (ii) and (iii) are optionally performed simultaneously;
    (iv) recycling the product of step (ii) to the aquaculture system;
    (v) transferring the water from the second container to an electrolysis unit and electrolyzing said water;

(vi) recycling the product of step (v) to the aquaculture system; and (vii) optionally, repeating steps (i) to (vi) in a continuous manner.

12. The process of claim 11, further comprising the step of dechlorinating the water obtained in steps ha or (v) prior to recycling said water back to the aquaculture system.

13. The process of claim 1, further comprising the step of adding a strong acid to the saline aquaculture system in step (a); or the step of adding a strong acid in step (c).

14. The process of claim 13, wherein the strong acid is $H_2SO_4$ or HCl.

15. The process of claim 1, further comprising the step of removing solids from said system so as to reduce or eliminate the amount of nitrifying microorganisms present in the aquaculture system, by passing a portion of the water from said aquaculture system through a solid separation unit prior to the electrolysis step (c), wherein the solid separation step may optionally be repeated in a continuous manner by recycling said water back to the aquaculture system.

16. The process of claim 1, further comprising stripping of $CO_2$ in step (a) or (c), wherein stripping of $CO_2$ comprises the addition of pure oxygen or air, or the use of stripping towers.

17. The process of claim 1, wherein step (c) further comprises reducing the amount of chemicals responsible for off-flavors in aquaculture species contained in said system.

18. The process of claim 17, wherein the chemicals responsible for off-flavors are geosmin (GSM) and/or 2-methylisoborneol (2-MIB).

19. The process of claim 1, wherein the electrolysis step (c) further results in minimization or reduction in trihalomethane (THM) formation as compared with an electrolysis step conducted at a higher pH value.

20. The process of claim 1, which further results in the reduction of nitrate and/or nitrite production as a result of a disinfection step which reduces the amount of nitrifying bacteria in the aquaculture system.

21. The process of claim 19, wherein the THM is reduced to values below about 100 ppb.

* * * * *